(12) United States Patent
Tolentino et al.

(10) Patent No.: US 10,543,813 B2
(45) Date of Patent: Jan. 28, 2020

(54) WIPER BLADE

(71) Applicant: Pylon Manufacturing Corp., Deerfield Beach, FL (US)

(72) Inventors: Vambi Raymundo Tolentino, Coconut Creek, FL (US); Robert Peter Peers, Boca Raton, FL (US)

(73) Assignee: Pylon Manufacturing Corp., Deerfield Beach, FL (US)

( * ) Notice: Subject to any disclaimer, the term of this patent is extended or adjusted under 35 U.S.C. 154(b) by 365 days.

(21) Appl. No.: 14/715,144

(22) Filed: May 18, 2015

(65) Prior Publication Data
US 2015/0274130 A1 Oct. 1, 2015
US 2019/0351875 A9 Nov. 21, 2019

Related U.S. Application Data

(63) Continuation of application No. 13/776,376, filed on Feb. 25, 2013, now abandoned.
(Continued)

(51) Int. Cl.
*B60S 1/38* (2006.01)
*B60S 1/04* (2006.01)

(52) U.S. Cl.
CPC ........... *B60S 1/3801* (2013.01); *B60S 1/0491* (2013.01); *B60S 1/3806* (2013.01); *B60S 1/3874* (2013.01);
(Continued)

(58) Field of Classification Search
CPC ........... B60S 1/3801; B60S 2001/3815; B60S 2001/3843
(Continued)

(56) References Cited

U.S. PATENT DOCUMENTS

D56,762 S    12/1920  Minier
2,310,751 A   2/1943  Scinta
(Continued)

FOREIGN PATENT DOCUMENTS

AR    206463       7/1976
AR    206463 A1    7/1976
(Continued)

OTHER PUBLICATIONS

International Search Report dated Oct. 19, 2012 for PCT/US2012/048843 filed Jul. 30, 2012.
(Continued)

*Primary Examiner* — Andrew A Horton
(74) *Attorney, Agent, or Firm* — Cozen O'Connor

(57) ABSTRACT

A wiper blade is presented having a wiper strip, a primary frame, and a pair of secondary frames. The primary frame having a connection device capable of connecting the wiper blade to a wiper arm disposed on a top side of the primary frame, and a connection structure disposed, on opposite ends of the primary frame. The pair of secondary frame, each have a central pivot connection portion and two leg portions extending from the central pivot connection portion, a pivot structure disposed on the central pivot connection portion of the secondary frames wherein the pivot structure of the secondary frames are connected to the connection structures on the ends of the primary frame. A wiper blade is also presented having a wiper strip, a force distribution structure having opposite ends, and a cover.

20 Claims, 11 Drawing Sheets

Related U.S. Application Data

(60) Provisional application No. 61/603,222, filed on Feb. 24, 2012.

(52) U.S. Cl.
CPC ............... *B60S 2001/3815* (2013.01); *B60S 2001/3843* (2013.01)

(58) Field of Classification Search
USPC .................................................... 15/250.201
See application file for complete search history.

(56) References Cited

U.S. PATENT DOCUMENTS

| | | |
|---|---|---|
| 2,550,094 A | 4/1951 | Smulski |
| 2,589,339 A | 3/1952 | Carson |
| 2,616,112 A | 11/1952 | Smulski |
| 2,643,411 A | 6/1953 | Nesson |
| 2,658,223 A | 11/1953 | Enochian |
| 2,799,887 A | 7/1957 | Nemic |
| 2,801,436 A | 8/1957 | Scinta |
| 2,814,820 A | 12/1957 | Elliot et al. |
| 2,890,472 A | 6/1959 | Olson |
| 2,932,843 A | 4/1960 | Zaiger et al. |
| 2,937,393 A | 5/1960 | Brueder |
| 2,946,078 A | 7/1960 | Deibel et al. |
| 3,116,510 A | 1/1961 | Oishei et al. |
| 3,029,460 A | 4/1962 | Hoyler |
| 3,037,233 A | 6/1962 | Peras et al. |
| 3,056,991 A | 10/1962 | Smithers |
| 3,082,464 A | 3/1963 | Smithers |
| 3,088,155 A | 5/1963 | Smithers |
| 3,089,174 A | 5/1963 | Bignon |
| 3,104,412 A | 9/1963 | Hinder |
| 3,132,367 A | 5/1964 | Wise |
| 3,139,644 A | 7/1964 | Smith |
| 3,147,506 A | 9/1964 | Williams |
| 3,147,507 A | 9/1964 | Glynm |
| 3,192,551 A | 7/1965 | Appel |
| 3,234,578 A | 2/1966 | Golub et al. |
| 3,296,647 A | 1/1967 | Gumbleton |
| 3,317,945 A | 5/1967 | Ludwig |
| 3,317,946 A | 5/1967 | Anderson |
| 3,350,738 A | 11/1967 | Anderson |
| D211,570 S | 7/1968 | Tomlin |
| 3,405,421 A | 10/1968 | Tomlin |
| 3,418,679 A | 12/1968 | Barth et al. |
| 3,480,986 A | 12/1969 | Forster |
| 3,588,941 A | 6/1971 | Schlesinger |
| 3,588,942 A | 6/1971 | Schlesinger |
| 3,618,155 A | 11/1971 | Mower |
| 3,665,544 A | 5/1972 | Sakamoto |
| 3,673,631 A | 7/1972 | Yamadai et al. |
| 3,685,086 A | 8/1972 | Frohlich |
| 3,751,754 A | 8/1973 | Quinlan et al. |
| 3,757,377 A | 9/1973 | Hayhurst |
| 3,780,395 A | 12/1973 | Quinlan et al. |
| 3,857,741 A | 12/1974 | Hultgren et al. |
| 3,862,465 A | 1/1975 | Ito |
| 3,872,535 A | 3/1975 | Arman |
| 3,872,537 A | 3/1975 | Bianchi |
| 3,879,793 A | 4/1975 | Schlegel |
| 3,879,794 A | 4/1975 | Roberts, Jr. |
| 3,881,213 A | 5/1975 | Tilli |
| 3,881,214 A | 5/1975 | Palu |
| D236,337 S | 8/1975 | Deibel |
| 3,929,222 A | 12/1975 | Smith et al. |
| 3,942,212 A | 3/1976 | Steger et al. |
| 3,969,784 A | 7/1976 | Journee |
| D240,809 S | 8/1976 | Deibel |
| 3,995,347 A | 12/1976 | Kohler |
| 4,007,511 A | 2/1977 | Deibel |
| 4,009,504 A | 3/1977 | Arman |
| 4,028,770 A | 6/1977 | Appel |
| 4,047,480 A | 9/1977 | Vassiliou |
| 4,063,328 A | 12/1977 | Arman |
| D248,375 S | 7/1978 | Bergstein |
| D248,388 S | 7/1978 | Hughes |
| 4,102,003 A | 7/1978 | Hancu |
| 4,127,912 A | 12/1978 | Deibel et al. |
| 4,127,916 A | 12/1978 | Van den Berg et al. |
| D253,040 S | 10/1979 | Fournier et al. |
| D253,167 S | 10/1979 | Fournier et al. |
| D257,339 S | 10/1980 | Ellinwood |
| 4,239,104 A | 12/1980 | Roccaforte et al. |
| 4,308,635 A | 1/1982 | Maiocco |
| 4,309,790 A | 1/1982 | Bauer et al. |
| 4,324,019 A | 4/1982 | Mohnach et al. |
| 4,327,458 A | 5/1982 | Maiocco |
| 4,334,001 A | 6/1982 | Horie et al. |
| 4,339,839 A | 7/1982 | Knights |
| 4,342,126 A | 8/1982 | Neefeldt |
| 4,343,063 A | 8/1982 | Batt |
| 4,343,064 A | 8/1982 | van den Berg et al. |
| 4,354,293 A | 10/1982 | Le Sausse et al. |
| D267,939 S | 2/1983 | Duvoux |
| D267,940 S | 2/1983 | Duvoux |
| D268,020 S | 2/1983 | Duvoux |
| 4,400,845 A | 8/1983 | Noguchi et al. |
| 4,416,032 A | 11/1983 | Mohnach et al. |
| 4,422,207 A | 12/1983 | Maiocco et al. |
| 4,438,543 A | 3/1984 | Noguchi et al. |
| 4,464,808 A | 8/1984 | Berry |
| 4,547,925 A | 10/1985 | Blackborow et al. |
| 4,561,143 A | 12/1985 | Beneteau |
| D282,243 S | 1/1986 | Mason |
| D282,718 S | 2/1986 | Fireman |
| 4,570,284 A | 2/1986 | Verton |
| 4,587,686 A | 5/1986 | Thompson |
| 4,590,638 A | 5/1986 | Beneteau |
| D286,499 S | 11/1986 | Moreno |
| D287,709 S | 1/1987 | Mower et al. |
| 4,649,591 A | 3/1987 | Guerard |
| 4,670,284 A | 6/1987 | Berkoff |
| 4,670,934 A | 6/1987 | Epple et al. |
| D295,020 S | 4/1988 | Franchi |
| 4,741,071 A | 5/1988 | Bauer et al. |
| D296,317 S | 6/1988 | Mower et al. |
| 4,760,934 A | 8/1988 | Epple et al. |
| 4,766,636 A | 8/1988 | Shinpo |
| D298,116 S | 10/1988 | Sussich |
| 4,782,547 A | 11/1988 | Mohnach |
| D298,926 S | 12/1988 | Rusnak |
| 4,795,288 A | 1/1989 | Sakai |
| 4,807,326 A | 2/1989 | Arai et al. |
| D301,329 S | 5/1989 | Cavicchioli |
| 4,852,206 A | 8/1989 | Fisher |
| D304,709 S | 11/1989 | Sussich |
| D307,408 S | 4/1990 | Mower et al. |
| D308,352 S | 6/1990 | Bradley |
| D308,660 S | 6/1990 | Fisher |
| D308,845 S | 6/1990 | Charet et al. |
| 4,930,180 A | 6/1990 | Longman |
| D310,193 S | 8/1990 | Charet |
| 4,971,472 A | 11/1990 | Pethers |
| 4,976,001 A | 12/1990 | Wright |
| 4,984,325 A | 1/1991 | Arai et al. |
| 4,989,290 A | 2/1991 | Hoshino |
| 5,027,947 A | 7/1991 | Reighart |
| 5,042,106 A | 8/1991 | Maubray |
| 5,056,183 A | 10/1991 | Haney, III |
| 5,062,176 A | 11/1991 | Unterborn et al. |
| D322,053 S | 12/1991 | Bradley |
| D322,772 S | 12/1991 | Leu et al. |
| D322,952 S | 1/1992 | Wu |
| 5,082,078 A | 1/1992 | Umeda et al. |
| D323,637 S | 2/1992 | Dipple |
| D324,014 S | 2/1992 | Ruminer |
| 5,084,933 A | 2/1992 | Buechele |
| 5,086,534 A | 2/1992 | Journee |
| D324,359 S | 3/1992 | Chen |
| D324,667 S | 3/1992 | Williams |
| 5,093,954 A | 3/1992 | Kuzuno |
| D327,013 S | 6/1992 | Reighart |

(56) References Cited

U.S. PATENT DOCUMENTS

| | | |
|---|---|---|
| D327,461 S | 6/1992 | Nelson |
| 5,123,140 A | 6/1992 | Raymond |
| D327,667 S | 7/1992 | Mar |
| D328,061 S | 7/1992 | Su |
| 5,138,739 A | 8/1992 | Maubray |
| D329,034 S | 9/1992 | Charet et al. |
| D329,997 S | 10/1992 | Leu |
| D330,181 S | 10/1992 | Charet et al. |
| D330,691 S | 11/1992 | Leu |
| D330,696 S | 11/1992 | Alain |
| D331,036 S | 11/1992 | Isley |
| D331,037 S | 11/1992 | Hsi |
| D331,212 S | 11/1992 | Poteet |
| D331,556 S | 12/1992 | Ismert |
| 5,168,596 A | 12/1992 | Maubray |
| 5,170,527 A | 12/1992 | Lyon, II |
| D332,593 S | 1/1993 | Gerardiello et al. |
| 5,179,761 A | 1/1993 | Buechele et al. |
| 5,182,831 A | 2/1993 | Knight |
| D334,161 S | 3/1993 | Wu et al. |
| D334,549 S | 4/1993 | Esquibel |
| 5,206,969 A | 5/1993 | Patterson et al. |
| D336,739 S | 6/1993 | Wu et al. |
| 5,218,735 A | 6/1993 | Maubray |
| 5,228,167 A | 7/1993 | Yang |
| 5,233,721 A | 8/1993 | Yang |
| D341,561 S | 11/1993 | Heckman et al. |
| 5,257,436 A | 11/1993 | Yang |
| D342,225 S | 12/1993 | Heckman et al. |
| 5,276,937 A | 1/1994 | Lan |
| 5,283,925 A | 2/1994 | Maubray |
| D345,329 S | 3/1994 | Kanellis et al. |
| D345,330 S | 3/1994 | Yang |
| D345,537 S | 3/1994 | Bianco et al. |
| D345,538 S | 3/1994 | Bianco et al. |
| 5,289,608 A | 3/1994 | Kim |
| 5,307,536 A | 5/1994 | Lescher |
| 5,311,636 A | 5/1994 | Lee |
| 5,312,177 A | 5/1994 | Coulter |
| D347,610 S | 6/1994 | Charet et al. |
| 5,319,826 A | 6/1994 | Mower |
| 5,325,564 A | 7/1994 | Swanepoel |
| D349,877 S | 8/1994 | Oyama |
| 5,333,351 A | 8/1994 | Sato |
| D350,723 S | 9/1994 | Longazel |
| 5,349,716 A | 9/1994 | Millar |
| 5,361,896 A | 11/1994 | Yang |
| D353,354 S | 12/1994 | Oyama |
| 5,372,449 A | 12/1994 | Bauer et al. |
| 5,383,248 A | 1/1995 | Hi |
| 5,383,249 A | 1/1995 | Yang |
| 5,392,489 A | 2/1995 | Mohnach |
| D357,626 S | 4/1995 | Snow et al. |
| 5,408,719 A | 4/1995 | DeRees et al. |
| 5,412,177 A | 5/1995 | Clark |
| 5,435,041 A | 7/1995 | Ho |
| 5,454,135 A | 10/1995 | Okuya et al. |
| 5,459,900 A | 10/1995 | Mege et al. |
| 5,463,790 A | 11/1995 | Chiou et al. |
| D365,079 S | 12/1995 | Abbott et al. |
| 5,485,650 A | 1/1996 | Swanepoel |
| 5,487,205 A | 1/1996 | Scherch et al. |
| 5,497,528 A | 3/1996 | Wu |
| 5,509,166 A | 4/1996 | Wagner et al. |
| D370,199 S | 5/1996 | Kim |
| 5,519,913 A | 5/1996 | Schedule |
| D370,653 S | 6/1996 | Kim |
| D370,654 S | 6/1996 | Kim |
| D372,217 S | 7/1996 | Abbott et al. |
| 5,564,157 A | 10/1996 | Kushida et al. |
| 5,566,419 A | 10/1996 | Zhou |
| 5,568,670 A | 10/1996 | Samples et al. |
| D375,289 S | 11/1996 | Waselewski et al. |
| 5,577,292 A | 11/1996 | Blachetta et al. |
| D376,792 S | 12/1996 | Chodkiewicz |
| 5,593,125 A | 1/1997 | Storz et al. |
| D377,754 S | 2/1997 | Abbott et al. |
| 5,606,766 A | 3/1997 | Lee |
| 5,613,266 A * | 3/1997 | Lee .......................... B60S 1/38 15/250.201 |
| 5,628,085 A | 5/1997 | Edele et al. |
| D379,613 S | 6/1997 | Chen |
| 5,647,088 A | 7/1997 | Bommer et al. |
| D382,848 S | 8/1997 | Chen |
| 5,661,870 A | 9/1997 | Eustache et al. |
| 5,661,871 A | 9/1997 | Scorsiroli |
| D389,449 S | 1/1998 | Hussaini |
| D390,823 S | 2/1998 | Baranowski et al. |
| D392,612 S | 3/1998 | Jonasson et al. |
| 5,732,437 A | 3/1998 | Jonasson et al. |
| D393,619 S | 4/1998 | Jeffer et al. |
| 5,742,973 A | 4/1998 | Kessler |
| D395,271 S | 6/1998 | Kim |
| D395,864 S | 7/1998 | Stahlhut et al. |
| D395,865 S | 7/1998 | Powell et al. |
| D396,840 S | 8/1998 | Vita |
| 5,791,010 A | 8/1998 | Brady et al. |
| 5,819,361 A | 10/1998 | Merkel et al. |
| 5,836,110 A | 11/1998 | Buening |
| D402,953 S | 12/1998 | Kim |
| D404,354 S | 1/1999 | Witek et al. |
| D406,094 S | 2/1999 | Lai |
| D406,257 S | 3/1999 | Lee |
| D406,755 S | 3/1999 | Garganese |
| D406,756 S | 3/1999 | Garganese |
| 5,875,672 A | 3/1999 | Fourie et al. |
| 5,885,023 A | 3/1999 | Witek et al. |
| 5,889,334 A | 3/1999 | Hongo |
| 5,899,334 A | 5/1999 | Domerchie et al. |
| D411,161 S | 6/1999 | Wooten |
| D411,504 S | 6/1999 | Hsu |
| 5,907,885 A | 6/1999 | Tilli et al. |
| 5,911,358 A | 6/1999 | Kenner et al. |
| 5,920,947 A | 7/1999 | Varner |
| D413,261 S | 8/1999 | Yerich |
| D414,456 S | 9/1999 | Hussaini et al. |
| 5,970,569 A | 10/1999 | Merkel et al. |
| 5,970,570 A | 10/1999 | Groninger |
| D417,180 S | 11/1999 | Shih |
| D418,103 S | 12/1999 | Don |
| D418,474 S | 1/2000 | Witek et al. |
| D419,950 S | 2/2000 | Spector |
| 6,026,537 A | 2/2000 | Hojnacki |
| 6,055,697 A | 5/2000 | Wollenschlaeger |
| 6,063,216 A | 5/2000 | Damm et al. |
| D427,134 S | 6/2000 | Lee |
| 6,070,723 A | 6/2000 | Lewis |
| 6,088,872 A | 7/2000 | Schmid et al. |
| D430,097 S | 8/2000 | Breesch et al. |
| 6,101,665 A | 8/2000 | Sahara et al. |
| D431,223 S | 9/2000 | Breesch et al. |
| 6,119,301 A | 9/2000 | Nakatsukasa et al. |
| D431,520 S | 10/2000 | Breesch et al. |
| D432,072 S | 10/2000 | Breesch et al. |
| D434,715 S | 12/2000 | Wang |
| 6,158,078 A | 12/2000 | Kotlarski |
| 6,161,248 A | 12/2000 | Merkel et al. |
| 6,192,546 B1 | 2/2001 | Kotlarski |
| 6,202,251 B1 | 3/2001 | Kotlarski |
| 6,216,311 B1 | 4/2001 | Van Damme et al. |
| D442,537 S | 5/2001 | Kim |
| 6,226,829 B1 | 5/2001 | Kotlarski |
| D443,245 S | 6/2001 | Kim |
| D443,582 S | 6/2001 | De Block |
| D443,854 S | 6/2001 | De Block |
| 6,247,590 B1 | 6/2001 | Baker |
| D444,760 S | 7/2001 | Houssat et al. |
| D445,754 S | 7/2001 | Benoit |
| 6,266,843 B1 | 7/2001 | Doman et al. |
| 6,279,191 B1 | 8/2001 | Kotlarski et al. |
| 6,279,746 B1 | 8/2001 | Hussaini et al. |
| D448,295 S | 9/2001 | Mozes |
| 6,286,176 B1 | 9/2001 | Westermann et al. |
| 6,292,974 B1 | 9/2001 | Merket et al. |

(56) References Cited

U.S. PATENT DOCUMENTS

| | | |
|---|---|---|
| 6,295,690 B1 | 10/2001 | Merkel et al. |
| 6,301,742 B1 | 10/2001 | Kota |
| 6,305,066 B1 | 10/2001 | De Paolo et al. |
| 6,308,373 B1 | 10/2001 | Merkel et al. |
| 6,327,738 B1 | 12/2001 | Lewis |
| 6,332,236 B1 | 12/2001 | Ku |
| 6,336,243 B1 | 1/2002 | Charng |
| D453,316 S | 2/2002 | Watanabe |
| 6,363,569 B1 | 4/2002 | Kotlarski |
| 6,367,117 B1 | 4/2002 | Sahara et al. |
| D457,479 S | 5/2002 | De Block et al. |
| 6,393,654 B2 | 5/2002 | Nacamuli |
| 6,397,428 B2 | 6/2002 | Kotlarski |
| 6,415,473 B1 | 7/2002 | Rapp |
| D462,044 S | 8/2002 | Gfatter et al. |
| 6,427,282 B1 | 8/2002 | Kotlarski |
| 6,434,780 B1 | 8/2002 | Kotlarski |
| D462,262 S | 9/2002 | Leja |
| 6,449,797 B1 | 9/2002 | De Block |
| 6,453,505 B1 | 9/2002 | Terai |
| D464,012 S | 10/2002 | Hussaini et al. |
| D464,600 S | 10/2002 | Chen |
| 6,499,181 B1 | 12/2002 | Kotlarski |
| D469,731 S | 2/2003 | Geer |
| 6,513,186 B1 | 2/2003 | Zimmer |
| 6,516,491 B2 | 2/2003 | Merkel et al. |
| 6,523,218 B1 | 2/2003 | Kotlarski |
| D471,505 S | 3/2003 | Wang |
| 6,530,111 B1 | 3/2003 | Kotlarski |
| D472,510 S | 4/2003 | Lin |
| D473,180 S | 4/2003 | Sun |
| D473,507 S | 4/2003 | Huang |
| 6,550,096 B1 | 4/2003 | Stewart et al. |
| 6,553,607 B1 | 4/2003 | De Block |
| D474,143 S | 5/2003 | Ho |
| 6,564,441 B2 | 5/2003 | Ibe et al. |
| 6,581,237 B1 | 6/2003 | Kotlarski |
| 6,606,759 B1 | 8/2003 | Hoshino |
| 6,609,267 B1 | 8/2003 | Journee et al. |
| 6,611,988 B1 | 9/2003 | De Block |
| 6,619,094 B2 | 9/2003 | Juhl |
| 6,622,540 B2 | 9/2003 | Jones et al. |
| 6,625,842 B1 | 9/2003 | De Block |
| 6,632,738 B2 | 10/2003 | Sone |
| 6,634,056 B1 | 10/2003 | De Block |
| 6,640,380 B2 | 11/2003 | Rosenstein et al. |
| 6,643,889 B1 | 11/2003 | Kotlarski |
| 6,651,292 B2 | 11/2003 | Komerska |
| 6,665,904 B1 | 12/2003 | Kerchaert |
| 6,668,419 B1 | 12/2003 | Kotlarski |
| 6,675,433 B1 | 1/2004 | Stewart et al. |
| 6,675,434 B1 | 1/2004 | Wilhelm et al. |
| 6,681,440 B2 | 1/2004 | Zimmer et al. |
| D487,047 S | 2/2004 | Kim |
| 6,687,948 B2 | 2/2004 | Kotlarski |
| 6,718,594 B1 | 4/2004 | Kotlarski |
| D490,763 S | 6/2004 | Kim |
| 6,766,906 B2 | 6/2004 | Charng |
| D494,125 S | 8/2004 | Leu |
| D494,527 S | 8/2004 | Hsu |
| D494,528 S | 8/2004 | Chiang |
| 6,785,931 B2 | 9/2004 | Lee et al. |
| 6,789,289 B2 | 9/2004 | Roodt |
| 6,792,644 B2 | 9/2004 | Roodt |
| 6,796,000 B2 | 9/2004 | Varner |
| 6,806,452 B2 | 10/2004 | Bos et al. |
| 6,810,555 B2 | 11/2004 | Ritt |
| 6,810,556 B1 | 11/2004 | Kotlarski |
| 6,813,803 B2 | 11/2004 | Leutsch |
| 6,813,923 B2 | 11/2004 | Jones et al. |
| 6,820,302 B2 | 11/2004 | Zimmer |
| 6,820,303 B2 | 11/2004 | Zimmer et al. |
| 6,820,304 B1 | 11/2004 | Gossez et al. |
| D499,962 S | 12/2004 | Kendrew Lee et al. |
| D500,728 S | 1/2005 | Leu |
| 6,836,924 B2 | 1/2005 | Egan-Walter |
| 6,836,925 B1 | 1/2005 | Swanepoel |
| 6,836,926 B1 | 1/2005 | De Block |
| 6,836,927 B2 | 1/2005 | De Block et al. |
| D501,819 S | 2/2005 | Hsu |
| 6,857,160 B2 | 2/2005 | Weiler et al. |
| 6,859,971 B2 | 3/2005 | Siklosi |
| 6,874,195 B2 | 4/2005 | Kotlarski |
| 6,883,966 B2 | 4/2005 | Zimmer |
| 6,886,213 B2 | 5/2005 | Merkel et al. |
| 6,904,639 B2 | 6/2005 | Dietrich et al. |
| 6,910,243 B1 | 6/2005 | Zimmer |
| 6,910,244 B2 | 6/2005 | De Block et al. |
| D508,226 S | 8/2005 | Lin |
| D508,888 S | 8/2005 | Carroll |
| 6,944,905 B2 | 9/2005 | De Block et al. |
| 6,946,810 B2 | 9/2005 | Kohlrausch |
| 6,951,043 B1 | 10/2005 | Fehrsen |
| D511,735 S | 11/2005 | Aoyama et al. |
| 6,964,079 B2 | 11/2005 | Zimmer |
| 6,964,080 B2 | 11/2005 | Knauf |
| 6,966,096 B2 | 11/2005 | Baseotto et al. |
| D512,362 S | 12/2005 | Breesch et al. |
| 6,973,698 B1 | 12/2005 | Kotlarski |
| 6,978,511 B2 | 12/2005 | Poton |
| 6,978,512 B2 | 12/2005 | Dietrich et al. |
| 7,007,339 B2 | 3/2006 | Weilet et al. |
| 7,024,722 B2 | 4/2006 | Neubauer et al. |
| 7,036,181 B2 | 5/2006 | Zimmer |
| D522,380 S | 6/2006 | Carl Dibnah et al. |
| 7,055,207 B2 | 6/2006 | Coughlin |
| 7,055,208 B2 | 6/2006 | Merkel et al. |
| 7,076,829 B2 | 7/2006 | Ritt |
| D527,336 S | 8/2006 | Van Baelen |
| 7,093,317 B1 | 8/2006 | Zimmer |
| 7,134,163 B2 | 11/2006 | Varner |
| 7,137,167 B2 | 11/2006 | Torii et al. |
| 7,143,463 B2 | 12/2006 | Baseotto et al. |
| 7,150,065 B2 | 12/2006 | Zimmer |
| 7,150,066 B1 | 12/2006 | Huang |
| 7,150,795 B2 | 12/2006 | Javaruski et al. |
| 7,166,979 B2 | 1/2007 | Zimmer |
| 7,171,718 B2 | 2/2007 | Moein et al. |
| D538,218 S | 3/2007 | Elwell et al. |
| 7,196,440 B2 | 3/2007 | Lamprecht |
| 7,207,082 B2 | 4/2007 | Lee |
| 7,228,588 B2 | 6/2007 | Kraemer et al. |
| D546,669 S | 7/2007 | Sheppard et al. |
| D547,713 S | 7/2007 | Goeller |
| D549,151 S | 8/2007 | Janssis et al. |
| D549,152 S | 8/2007 | Goeller |
| 7,256,565 B2 | 8/2007 | Merkel et al. |
| 7,257,856 B2 | 8/2007 | Zimmer |
| 7,258,233 B2 | 8/2007 | Lee |
| 7,272,890 B2 | 9/2007 | Zimmer et al. |
| D552,486 S | 10/2007 | Herring et al. |
| 7,281,294 B2 | 10/2007 | Wilms et al. |
| D556,118 S | 11/2007 | Claes |
| 7,293,321 B2 | 11/2007 | Breesch |
| 7,299,520 B2 | 11/2007 | Huang |
| 7,316,047 B2 | 1/2008 | Thienard |
| 7,316,048 B2 | 1/2008 | Yamane et al. |
| 7,316,087 B1 | 1/2008 | Smith |
| D564,434 S | 3/2008 | Claes |
| D564,955 S | 3/2008 | Claes |
| 7,337,900 B2 | 3/2008 | Reiber et al. |
| 7,341,396 B2 | 3/2008 | Huang |
| 7,353,562 B2 | 4/2008 | Huang |
| D569,327 S | 5/2008 | Lin |
| D569,328 S | 5/2008 | Lin |
| 7,370,385 B2 | 5/2008 | Chiang |
| D573,457 S | 7/2008 | Park |
| 7,398,577 B2 | 7/2008 | Genet |
| D575,146 S | 8/2008 | Lee |
| D577,324 S | 9/2008 | McCray |
| 7,434,291 B2 | 10/2008 | Chiang |
| D579,849 S | 11/2008 | Garrastacho et al. |
| 7,451,520 B2 | 11/2008 | Weiler et al. |
| D582,765 S | 12/2008 | Gustafson et al. |

(56) References Cited

U.S. PATENT DOCUMENTS

| | | | |
|---|---|---|---|
| 7,461,429 B2 * | 12/2008 | Huang | B60S 1/3806 |
| | | | 15/250.201 |
| 7,464,433 B2 | 12/2008 | Thomar et al. | |
| D584,160 S | 1/2009 | Zimmermann | |
| 7,472,451 B2 | 1/2009 | Hara et al. | |
| D586,663 S | 2/2009 | Tidqvist | |
| D586,716 S | 2/2009 | Radfar | |
| D586,717 S | 2/2009 | Depondt | |
| D587,186 S | 2/2009 | Herinckx et al. | |
| 7,484,264 B2 | 2/2009 | Kraemer et al. | |
| 7,493,672 B2 | 2/2009 | Op't Roodt | |
| D588,933 S | 3/2009 | Bonzagni et al. | |
| 7,503,095 B2 | 3/2009 | Lin et al. | |
| 7,506,401 B2 | 3/2009 | Park | |
| 7,509,704 B2 | 3/2009 | Bauer et al. | |
| 7,523,519 B2 | 4/2009 | Egner-Walter et al. | |
| 7,523,520 B2 | 4/2009 | Breesch | |
| 7,523,522 B2 | 4/2009 | Herring et al. | |
| D592,121 S | 5/2009 | Bratec et al. | |
| 7,526,832 B2 | 5/2009 | Matsumoto et al. | |
| 7,527,151 B2 | 5/2009 | Park | |
| D593,480 S | 6/2009 | Kim | |
| D593,923 S | 6/2009 | Bratec et al. | |
| 7,543,353 B2 | 6/2009 | Ko | |
| 7,552,502 B2 | 6/2009 | Kagawa et al. | |
| D596,102 S | 7/2009 | Kim | |
| 7,559,110 B1 | 7/2009 | Kotlarski et al. | |
| D601,077 S | 9/2009 | Kim | |
| 7,581,280 B2 | 9/2009 | Op't Roodt et al. | |
| 7,581,887 B2 | 9/2009 | Zimmer | |
| 7,584,520 B2 | 9/2009 | Hussaini et al. | |
| 7,596,479 B2 | 9/2009 | Weiler et al. | |
| 7,603,741 B2 | 10/2009 | Verelst et al. | |
| 7,603,742 B2 | 10/2009 | Nakano et al. | |
| 7,607,194 B2 | 10/2009 | Weber et al. | |
| 7,614,499 B2 | 11/2009 | Mueller | |
| 7,621,016 B2 | 11/2009 | Verelst et al. | |
| 7,628,560 B2 | 12/2009 | Westermann et al. | |
| 7,634,833 B2 | 12/2009 | Boland et al. | |
| 7,636,980 B2 | 12/2009 | Nakano | |
| D608,717 S | 1/2010 | Aglassinger | |
| D610,518 S | 2/2010 | Aglassinger | |
| D610,519 S | 2/2010 | Aglassinger | |
| D610,520 S | 2/2010 | Aglassinger | |
| D611,809 S | 3/2010 | Borgerson et al. | |
| 7,669,276 B2 | 3/2010 | Verelst et al. | |
| 7,687,565 B2 | 3/2010 | Geilenkirchen | |
| 7,690,073 B2 | 4/2010 | Marmoy et al. | |
| 7,690,509 B2 | 4/2010 | Herring et al. | |
| 7,699,169 B2 | 4/2010 | Lewis | |
| D615,918 S | 5/2010 | Kim | |
| 7,707,680 B2 | 5/2010 | Hawighorst et al. | |
| 7,716,780 B2 | 5/2010 | Scholl et al. | |
| 7,718,509 B2 | 5/2010 | Endo et al. | |
| 7,743,457 B2 | 6/2010 | Metz | |
| 7,748,076 B2 | 7/2010 | Weiler et al. | |
| D621,322 S | 8/2010 | Lee et al. | |
| 7,780,214 B2 | 8/2010 | Kraus et al. | |
| 7,788,761 B2 | 9/2010 | Weiler et al. | |
| 7,793,382 B2 | 9/2010 | Van De Rovaart | |
| 7,797,787 B2 | 9/2010 | Wilms et al. | |
| 7,805,800 B2 | 10/2010 | Wilms et al. | |
| 7,810,206 B2 | 10/2010 | Weiler et al. | |
| 7,814,611 B2 | 10/2010 | Heinrich et al. | |
| D627,288 S | 11/2010 | Lee | |
| 7,823,953 B2 | 11/2010 | Haas | |
| 7,832,045 B2 | 11/2010 | Weiler et al. | |
| 7,832,047 B2 | 11/2010 | Herinckx et al. | |
| 7,836,542 B2 | 11/2010 | Dietrich et al. | |
| 7,849,553 B2 | 12/2010 | Weiler et al. | |
| D632,557 S | 2/2011 | Clamagirand et al. | |
| 7,886,401 B2 | 2/2011 | Weber et al. | |
| 7,891,043 B2 | 2/2011 | Kraus et al. | |
| 7,891,044 B2 | 2/2011 | Fink et al. | |
| 7,895,702 B2 | 3/2011 | Tisch et al. | |
| 7,895,703 B2 | 3/2011 | Ina et al. | |
| 7,898,141 B2 | 3/2011 | Hurst et al. | |
| 7,899,596 B2 | 3/2011 | Zimmer | |
| 7,908,703 B2 | 3/2011 | Van Bealen | |
| 7,908,704 B2 | 3/2011 | Kraemer | |
| 7,921,503 B1 | 4/2011 | Chiang | |
| 7,921,504 B1 | 4/2011 | Chiang | |
| 7,921,506 B2 | 4/2011 | Chiang | |
| 7,926,659 B2 | 4/2011 | Kim | |
| 7,930,796 B2 | 4/2011 | Weiler et al. | |
| D637,132 S | 5/2011 | Kim | |
| 7,937,798 B2 | 5/2011 | Fink et al. | |
| 7,941,891 B2 | 5/2011 | Breesch | |
| 7,941,892 B2 | 5/2011 | Kraus et al. | |
| 7,945,985 B2 | 5/2011 | Stubner | |
| 7,945,987 B2 | 5/2011 | Verelst et al. | |
| 7,950,717 B2 | 5/2011 | Metz | |
| 7,962,787 B2 | 6/2011 | Camilleri et al. | |
| 7,966,689 B2 | 6/2011 | Rovaart et al. | |
| 7,971,312 B2 | 7/2011 | Crabee et al. | |
| 7,975,849 B2 | 7/2011 | Kim | |
| 7,979,950 B2 | 7/2011 | Boland | |
| 7,989,955 B2 | 8/2011 | Yagi | |
| 7,989,995 B2 | 8/2011 | Reith et al. | |
| 7,992,248 B2 | 8/2011 | Koppen et al. | |
| 7,996,953 B2 | 8/2011 | Braun et al. | |
| D644,925 S | 9/2011 | Jaworski | |
| 8,020,246 B2 | 9/2011 | Bauer et al. | |
| 8,020,248 B2 | 9/2011 | Hasegawa | |
| 8,020,249 B2 | 9/2011 | Masuda et al. | |
| 8,024,836 B2 | 9/2011 | Moll et al. | |
| 8,026,645 B2 | 9/2011 | Stubner et al. | |
| D647,451 S | 10/2011 | Lin | |
| 8,042,690 B2 | 10/2011 | Lewis | |
| D647,795 S | 11/2011 | Eaton et al. | |
| 8,051,526 B2 | 11/2011 | Summerville et al. | |
| 8,060,976 B2 | 11/2011 | Mayer et al. | |
| 8,069,528 B2 | 12/2011 | Verelst et al. | |
| 8,076,807 B2 | 12/2011 | Bohn et al. | |
| D651,509 S | 1/2012 | Methe et al. | |
| 8,096,013 B2 | 1/2012 | Eschenbrenner et al. | |
| 8,099,823 B2 | 1/2012 | Kraemer et al. | |
| 8,104,134 B2 | 1/2012 | Ritt | |
| 8,104,136 B2 | 1/2012 | Carangelo | |
| 8,117,710 B2 | 2/2012 | Kraus et al. | |
| 8,125,111 B2 | 2/2012 | Bohn et al. | |
| 8,141,198 B2 | 3/2012 | Wilms et al. | |
| 8,148,467 B2 | 4/2012 | Pieters et al. | |
| 8,151,656 B2 | 4/2012 | Nicgorski, II | |
| 8,156,604 B2 | 4/2012 | Kraus et al. | |
| 8,156,605 B2 | 4/2012 | Dietrich et al. | |
| 8,165,796 B2 | 4/2012 | Hoetzer | |
| D658,494 S | 5/2012 | Raimer et al. | |
| 8,166,605 B2 | 5/2012 | Lee | |
| 8,169,791 B2 | 5/2012 | Wolf et al. | |
| 8,180,518 B2 | 5/2012 | Petricoin, Jr. | |
| 8,181,305 B2 | 5/2012 | Boos | |
| 8,181,306 B2 | 5/2012 | Merkel | |
| 8,181,307 B2 | 5/2012 | Wilms et al. | |
| 8,181,308 B2 | 5/2012 | Kwon et al. | |
| 8,186,002 B2 | 5/2012 | Kinnaert et al. | |
| 8,191,200 B2 | 6/2012 | Kim | |
| 8,191,201 B2 | 6/2012 | De Block et al. | |
| 8,196,253 B2 | 6/2012 | Barlas | |
| 8,196,254 B2 | 6/2012 | Mahfoudh et al. | |
| 8,196,255 B2 | 6/2012 | De Block et al. | |
| 8,205,290 B2 | 6/2012 | Weiler et al. | |
| 8,205,291 B2 | 6/2012 | Eschenbrenner et al. | |
| 8,214,965 B2 | 7/2012 | Volz et al. | |
| 8,230,547 B2 | 7/2012 | Wilms et al. | |
| 8,234,746 B2 | 8/2012 | Lutterodt et al. | |
| 8,245,350 B2 | 8/2012 | Van De Rostyne et al. | |
| 8,256,851 B2 | 9/2012 | Pelosse | |
| 8,261,403 B2 | 9/2012 | Ehde | |
| 8,261,405 B2 | 9/2012 | Kim et al. | |
| 8,261,628 B2 | 9/2012 | Moecklin et al. | |
| 8,266,759 B2 | 9/2012 | Braun et al. | |
| 8,272,096 B2 | 9/2012 | Wilms et al. | |
| 8,272,360 B2 | 9/2012 | Hartmann et al. | |

(56) References Cited

U.S. PATENT DOCUMENTS

| | | |
|---|---|---|
| 8,286,533 B2 | 10/2012 | Hurst et al. |
| 8,294,327 B2 | 10/2012 | Chaumet et al. |
| D671,827 S | 12/2012 | Raimer et al. |
| 8,322,456 B2 | 12/2012 | Pozgay et al. |
| 8,327,500 B2 | 12/2012 | De Block et al. |
| 8,328,011 B2 | 12/2012 | Skurdalsvold et al. |
| 8,333,093 B2 | 12/2012 | Kleckner et al. |
| D674,733 S | 1/2013 | Lee |
| 8,341,799 B2 | 1/2013 | Koppen et al. |
| 8,347,449 B2 | 1/2013 | Genet et al. |
| 8,356,520 B2 | 1/2013 | Hurst et al. |
| 8,359,701 B2 | 1/2013 | De Block et al. |
| 8,361,595 B2 | 1/2013 | Van De Rostyne et al. |
| 8,370,986 B2 | 2/2013 | Wilms et al. |
| 8,370,987 B2 | 2/2013 | Ritt |
| 8,370,988 B2 | 2/2013 | Kraus et al. |
| 8,373,322 B2 | 2/2013 | Wegner et al. |
| 8,375,503 B2 | 2/2013 | Aznag |
| 8,381,348 B2 | 2/2013 | Egner-Walter et al. |
| 8,381,349 B2 | 2/2013 | Ku |
| 8,381,350 B2 | 2/2013 | Op't Roodt et al. |
| 8,397,340 B2 | 3/2013 | Weiler et al. |
| 8,397,341 B2 | 3/2013 | Ehde |
| D679,234 S | 4/2013 | Depondt |
| D679,235 S | 4/2013 | Depondt |
| D680,051 S | 4/2013 | Tolentino et al. |
| 8,410,651 B2 | 4/2013 | Lauk |
| 8,413,291 B2 | 4/2013 | Wu |
| 8,413,292 B2 | 4/2013 | Yang et al. |
| 8,418,644 B2 | 4/2013 | Fiedor et al. |
| 8,424,149 B2 | 4/2013 | Coemans et al. |
| 8,429,786 B2 | 4/2013 | Van Baelen et al. |
| 8,434,621 B2 | 5/2013 | Hun et al. |
| 8,448,289 B2 | 5/2013 | Reith et al. |
| 8,448,290 B2 | 5/2013 | Op't Roodt et al. |
| D684,862 S | 6/2013 | DiFranza |
| 8,453,292 B2 | 6/2013 | Jeon |
| D685,260 S | 7/2013 | Thielemier |
| D686,912 S | 7/2013 | Ehde et al. |
| 8,474,088 B2 | 7/2013 | Wu |
| 8,484,794 B2 | 7/2013 | Westermann et al. |
| 8,490,239 B2 | 7/2013 | Ehde |
| 8,495,787 B2 | 7/2013 | Garrastacho et al. |
| 8,499,408 B2 | 8/2013 | Boland |
| 8,505,151 B2 | 8/2013 | Depondt et al. |
| 8,505,152 B2 | 8/2013 | Boland |
| 8,505,724 B2 | 8/2013 | Bult et al. |
| 8,510,895 B2 | 8/2013 | Beelen et al. |
| 8,510,897 B2 | 8/2013 | Ku |
| 8,510,898 B2 | 8/2013 | Ku |
| 8,522,393 B2 | 9/2013 | Boland |
| 8,539,634 B2 | 9/2013 | Wilms et al. |
| 8,544,136 B2 | 10/2013 | Kraemer et al. |
| 8,544,137 B2 | 10/2013 | Thienard |
| 8,549,695 B2 | 10/2013 | Reith et al. |
| 8,552,113 B2 | 10/2013 | Pieters et al. |
| 8,555,455 B2 | 10/2013 | Boland |
| 8,555,456 B2 | 10/2013 | Ehde |
| 8,561,717 B2 | 10/2013 | Pozgay et al. |
| D692,750 S | 11/2013 | Ehde et al. |
| D692,818 S | 11/2013 | Tolentino et al. |
| D692,819 S | 11/2013 | Tolentino et al. |
| D693,213 S | 11/2013 | Lee et al. |
| 8,574,791 B2 | 11/2013 | Maus et al. |
| 8,575,078 B2 | 11/2013 | Duval et al. |
| 8,581,530 B2 | 11/2013 | Tisch |
| 8,582,809 B2 | 11/2013 | Halimeh et al. |
| 8,584,303 B2 | 11/2013 | Wolfgarten et al. |
| 8,590,097 B2 | 11/2013 | Bohn et al. |
| D695,632 S | 12/2013 | Akana et al. |
| 8,595,888 B2 | 12/2013 | Op't Roodt et al. |
| 8,595,889 B2 | 12/2013 | Op't Roodt et al. |
| 8,613,357 B2 | 12/2013 | Putnam |
| D697,790 S | 1/2014 | Iwegbu |
| 8,646,181 B2 | 2/2014 | Baumann et al. |
| D700,524 S | 3/2014 | Ferriter |
| 8,661,602 B2 | 3/2014 | Op't Roodt et al. |
| D702,619 S | 4/2014 | Kim |
| 8,686,612 B2 | 4/2014 | Roos et al. |
| 8,707,506 B1 | 4/2014 | Wu |
| D704,127 S | 5/2014 | Depondt |
| D704,128 S | 5/2014 | Depondt |
| D704,129 S | 5/2014 | Depondt |
| D704,619 S | 5/2014 | Kim |
| D704,620 S | 5/2014 | Kim |
| 8,717,011 B2 | 5/2014 | Henning |
| 8,719,994 B2 | 5/2014 | Thienard et al. |
| 8,720,033 B2 | 5/2014 | Koppen et al. |
| 8,728,367 B2 | 5/2014 | Lay et al. |
| D706,200 S | 6/2014 | Tolentino et al. |
| D706,201 S | 6/2014 | Depondt |
| D706,202 S | 6/2014 | Depondt |
| 8,745,812 B2 | 6/2014 | Kruse et al. |
| 8,745,813 B2 | 6/2014 | Ishida et al. |
| 8,749,186 B2 | 6/2014 | Stubner et al. |
| 8,759,449 B2 | 6/2014 | Pieters et al. |
| D708,890 S | 7/2014 | Kim et al. |
| D709,362 S | 7/2014 | Kim |
| 8,769,762 B2 | 7/2014 | Op't Roodt et al. |
| 8,770,063 B2 | 7/2014 | Bhatti |
| 8,782,847 B2 | 7/2014 | Depondt |
| D711,217 S | 8/2014 | Jacobs et al. |
| 8,800,097 B2 | 8/2014 | Wegner et al. |
| 8,800,099 B2 | 8/2014 | Boland |
| 8,806,700 B2 | 8/2014 | Tolentino et al. |
| 8,813,608 B2 | 8/2014 | Hurst et al. |
| 8,823,228 B2 | 9/2014 | Mili et al. |
| 8,839,483 B2 | 9/2014 | Roodt et al. |
| D714,635 S | 10/2014 | Demar et al. |
| D715,142 S | 10/2014 | Allen et al. |
| 8,850,653 B2 | 10/2014 | Depondt |
| 8,854,455 B2 | 10/2014 | Haug |
| 8,857,595 B2 | 10/2014 | Mill et al. |
| 8,863,370 B2 | 10/2014 | Weiler et al. |
| 8,871,994 B2 | 10/2014 | Wei et al. |
| D717,225 S | 11/2014 | Kuo |
| 8,881,338 B2 | 11/2014 | Thielen et al. |
| 8,893,348 B2 | 11/2014 | Vankerkhove et al. |
| 8,909,421 B2 | 12/2014 | Zimmer |
| 8,913,132 B2 | 12/2014 | Seger et al. |
| 8,913,133 B2 | 12/2014 | Huelsen et al. |
| 8,917,323 B2 | 12/2014 | Seger et al. |
| 8,931,133 B2 | 1/2015 | Coart et al. |
| 8,935,056 B2 | 1/2015 | Zimmer |
| 8,938,847 B2 | 1/2015 | Avasiloaie et al. |
| 8,950,034 B2 | 2/2015 | Wilms |
| 8,950,035 B2 | 2/2015 | Benner et al. |
| 8,957,619 B2 | 2/2015 | Karcher |
| 8,963,464 B2 | 2/2015 | Braun et al. |
| D725,025 S | 3/2015 | Poton |
| 8,973,207 B2 | 3/2015 | Depondt |
| 8,973,209 B2 | 3/2015 | Depondt |
| 8,979,066 B2 | 3/2015 | Pfetzer et al. |
| 8,984,707 B2 | 3/2015 | Boland |
| 8,985,241 B2 | 3/2015 | Pozgay et al. |
| 8,997,304 B2 | 4/2015 | Oslizlo et al. |
| 9,003,594 B2 | 4/2015 | Guidez |
| 9,003,596 B2 | 4/2015 | Avasiloaie et al. |
| 9,008,905 B2 | 4/2015 | Prskawetz et al. |
| 9,015,896 B2 | 4/2015 | De Block |
| 9,018,877 B2 | 4/2015 | Braun et al. |
| 9,021,651 B2 | 5/2015 | Wolfgarten |
| 9,021,652 B2 | 5/2015 | Coemans et al. |
| 9,045,111 B2 | 6/2015 | Zimmer |
| 9,045,113 B2 | 6/2015 | Aznag et al. |
| 9,050,946 B2 | 6/2015 | Zimmer et al. |
| 9,056,595 B2 | 6/2015 | Wegner et al. |
| 9,071,089 B2 | 6/2015 | Kastinger et al. |
| 9,073,519 B2 | 7/2015 | Depondt |
| 9,079,567 B2 | 7/2015 | Wegner et al. |
| 9,096,196 B2 | 8/2015 | Criel et al. |
| 9,108,595 B2 | 8/2015 | Tolentino et al. |
| 9,114,754 B2 | 8/2015 | Ehlgen et al. |
| 9,114,783 B2 | 8/2015 | Depondt |

(56) References Cited

U.S. PATENT DOCUMENTS

| | | |
|---|---|---|
| 9,120,463 B2 | 9/2015 | Kim et al. |
| 9,120,464 B2 | 9/2015 | Pack et al. |
| 9,151,372 B2 | 10/2015 | Keller |
| 9,174,609 B2 | 11/2015 | Tolentino et al. |
| 9,174,611 B2 | 11/2015 | Tolentino et al. |
| 9,180,839 B2 | 11/2015 | Oslizlo et al. |
| D744,331 S | 12/2015 | Vos et al. |
| 9,211,867 B2 | 12/2015 | Beelen et al. |
| 9,211,868 B2 | 12/2015 | Bousset et al. |
| 9,225,274 B2 | 12/2015 | Lingenfelser et al. |
| D746,700 S | 1/2016 | Boehnen et al. |
| 9,227,596 B2 | 1/2016 | Van De Rovaart et al. |
| 9,227,598 B2 | 1/2016 | Smets et al. |
| 9,233,664 B2 | 1/2016 | Weidlich |
| 9,254,820 B2 | 2/2016 | Geubel et al. |
| 9,260,085 B2 | 2/2016 | Bex et al. |
| 9,266,504 B2 | 2/2016 | De Block |
| 9,272,676 B2 | 3/2016 | Heger et al. |
| 9,505,380 B2 | 11/2016 | Tolentino et al. |
| D777,079 S | 1/2017 | Tolentino et al. |
| D784,804 S | 4/2017 | Peers et al. |
| D787,308 S | 5/2017 | Kawashima et al. |
| D787,312 S | 5/2017 | Peers et al. |
| 2001/0013236 A1 | 8/2001 | Weyerstall et al. |
| 2002/0043092 A1 | 4/2002 | Jones et al. |
| 2002/0112306 A1 | 8/2002 | Komerska |
| 2002/0174505 A1 | 11/2002 | Kim |
| 2002/0192017 A1 | 12/2002 | Rosenstein et al. |
| 2003/0014828 A1 | 1/2003 | Edner-Walter et al. |
| 2003/0028990 A1 | 2/2003 | Zimmer |
| 2003/0033683 A1 | 2/2003 | Kotlarski |
| 2003/0074763 A1 | 4/2003 | Egner-Walter et al. |
| 2003/0159229 A1 | 8/2003 | Weiler et al. |
| 2003/0209049 A1 | 11/2003 | Jones et al. |
| 2003/0221276 A1 | 12/2003 | Siklosi |
| 2003/0229961 A1 | 12/2003 | Barnett |
| 2004/0010882 A1 | 1/2004 | Breesch |
| 2004/0025280 A1 | 2/2004 | Krickau et al. |
| 2004/0025281 A1 | 2/2004 | Baseotto et al. |
| 2004/0052577 A1 | 3/2004 | Lee et al. |
| 2004/0098821 A1 | 5/2004 | Kraemer et al. |
| 2004/0159994 A1 | 8/2004 | Lenzen et al. |
| 2004/0211021 A1 | 10/2004 | Weber et al. |
| 2004/0244137 A1 | 12/2004 | Poton |
| 2004/0250369 A1 | 12/2004 | Matsumoto et al. |
| 2005/0005387 A1 | 1/2005 | Kinoshita et al. |
| 2005/0011033 A1 | 1/2005 | Thomar et al. |
| 2005/0039292 A1 | 2/2005 | Boland |
| 2005/0166349 A1 | 8/2005 | Nakano et al. |
| 2005/0177970 A1 | 8/2005 | Scholl et al. |
| 2005/0252812 A1 | 11/2005 | Lewis |
| 2006/0010636 A1 | 1/2006 | Vacher |
| 2006/0026786 A1 | 2/2006 | Ku |
| 2006/0112511 A1 | 6/2006 | Op't Roodt et al. |
| 2006/0117515 A1 | 6/2006 | Fink et al. |
| 2006/0130263 A1 | 6/2006 | Coughlin |
| 2006/0156529 A1 | 7/2006 | Thomar et al. |
| 2006/0179597 A1 | 8/2006 | Hoshino et al. |
| 2006/0218740 A1 | 10/2006 | Coughlin |
| 2006/0230571 A1 | 10/2006 | Son |
| 2006/0248675 A1 | 11/2006 | Vacher et al. |
| 2006/0282972 A1 | 12/2006 | Huang |
| 2007/0017056 A1 | 1/2007 | Cooke et al. |
| 2007/0067939 A1 | 3/2007 | Huang |
| 2007/0067941 A1 | 3/2007 | Huang |
| 2007/0089257 A1 | 4/2007 | Harita et al. |
| 2007/0089527 A1 | 4/2007 | Shank et al. |
| 2007/0186366 A1 | 8/2007 | Alley |
| 2007/0220698 A1 | 9/2007 | Huang |
| 2007/0226940 A1 | 10/2007 | Thienard |
| 2007/0226941 A1 | 10/2007 | Kraemer et al. |
| 2007/0234501 A1 | 10/2007 | Ho et al. |
| 2007/0266517 A1 | 11/2007 | Kim et al. |
| 2008/0083082 A1 | 4/2008 | Rovaart et al. |
| 2008/0086830 A1 | 4/2008 | Kim |
| 2008/0092320 A1 | 4/2008 | Cempura et al. |
| 2008/0098554 A1 | 5/2008 | Cho |
| 2008/0098559 A1* | 5/2008 | Machida ............... B60S 1/3801 15/250.201 |
| 2008/0115308 A1 | 5/2008 | Lee |
| 2008/0148509 A1 | 6/2008 | Bacarelia et al. |
| 2008/0196192 A1 | 8/2008 | Yao |
| 2008/0222830 A1 | 9/2008 | Chiang |
| 2008/0222831 A1 | 9/2008 | Thienard |
| 2008/0222832 A1 | 9/2008 | Huang |
| 2008/0263805 A1 | 10/2008 | Sebring |
| 2008/0289133 A1 | 11/2008 | Kim |
| 2009/0007364 A1 | 1/2009 | Jarasson et al. |
| 2009/0013492 A1 | 1/2009 | Henin |
| 2009/0056049 A1 | 3/2009 | Jarasson et al. |
| 2009/0064440 A1 | 3/2009 | Boland |
| 2009/0126140 A1 | 5/2009 | Heinrich et al. |
| 2009/0151110 A1 | 6/2009 | Ku |
| 2009/0158545 A1 | 6/2009 | Grasso et al. |
| 2009/0158547 A1 | 6/2009 | Kim |
| 2009/0172910 A1 | 7/2009 | De Block et al. |
| 2009/0178226 A1 | 7/2009 | Lee et al. |
| 2009/0199357 A1 | 8/2009 | Thienard |
| 2010/0000041 A1 | 1/2010 | Boland |
| 2010/0005608 A1 | 1/2010 | Chien |
| 2010/0005609 A1 | 1/2010 | Kim |
| 2010/0024149 A1 | 2/2010 | Erdal |
| 2010/0024151 A1 | 2/2010 | Ku |
| 2010/0050360 A1 | 3/2010 | Chiang |
| 2010/0050361 A1 | 3/2010 | Chang et al. |
| 2010/0064468 A1 | 3/2010 | Kang |
| 2010/0083454 A1 | 4/2010 | Op't Roodt et al. |
| 2010/0186185 A1 | 7/2010 | Grasso et al. |
| 2010/0205763 A1 | 8/2010 | Ku |
| 2010/0212101 A1 | 8/2010 | Thienard et al. |
| 2010/0236008 A1 | 9/2010 | Yang et al. |
| 2010/0236675 A1 | 9/2010 | Schneider |
| 2010/0242204 A1 | 9/2010 | Chien |
| 2010/0251502 A1* | 10/2010 | Summerville .......... B60S 1/345 15/250.32 |
| 2010/0281645 A1 | 11/2010 | Kim et al. |
| 2011/0005020 A1 | 1/2011 | Koppen et al. |
| 2011/0041280 A1 | 2/2011 | Choi et al. |
| 2011/0047742 A1 | 3/2011 | Kim et al. |
| 2011/0072607 A1 | 3/2011 | Van Baelen et al. |
| 2011/0107542 A1 | 5/2011 | Op't Roodt |
| 2011/0113582 A1 | 5/2011 | Kruse et al. |
| 2011/0113583 A1 | 5/2011 | Shanmugham et al. |
| 2011/0162161 A1 | 7/2011 | Amado |
| 2011/0192511 A1 | 8/2011 | Marrone |
| 2011/0219563 A1 | 9/2011 | Guastella et al. |
| 2011/0277264 A1 | 11/2011 | Ehde |
| 2011/0277266 A1 | 11/2011 | Umeno |
| 2012/0027206 A1 | 2/2012 | Suzuki et al. |
| 2012/0047673 A1 | 3/2012 | Depondt |
| 2012/0054976 A1 | 3/2012 | Yang et al. |
| 2012/0060316 A1 | 3/2012 | Avasiloaie et al. |
| 2012/0066857 A1 | 3/2012 | Webert |
| 2012/0090123 A1 | 4/2012 | Caillot et al. |
| 2012/0102669 A1 | 5/2012 | Lee et al. |
| 2012/0144615 A1 | 6/2012 | Song et al. |
| 2012/0159733 A1 | 6/2012 | Kwon |
| 2012/0180245 A1 | 7/2012 | Ku |
| 2012/0180246 A1 | 7/2012 | Ku |
| 2012/0186035 A1 | 7/2012 | Lee |
| 2012/0266405 A1 | 10/2012 | Tolentinto et al. |
| 2012/0279008 A1 | 11/2012 | Depondt |
| 2012/0311808 A1 | 12/2012 | Yang et al. |
| 2012/0317740 A1 | 12/2012 | Yang et al. |
| 2013/0025084 A1 | 1/2013 | Tolentino et al. |
| 2013/0067674 A1 | 3/2013 | Chiang |
| 2013/0067675 A1 | 3/2013 | Chien |
| 2013/0067678 A1 | 3/2013 | Ehde |
| 2013/0104334 A1 | 5/2013 | Depondt |
| 2013/0117957 A1 | 5/2013 | Ku |
| 2013/0125333 A1 | 5/2013 | Tolentino et al. |
| 2013/0152323 A1 | 6/2013 | Chien |
| 2013/0152326 A1 | 6/2013 | Oslizlo et al. |
| 2013/0152330 A1 | 6/2013 | Kim et al. |

(56) References Cited

U.S. PATENT DOCUMENTS

| | | |
|---|---|---|
| 2013/0167316 A1 | 7/2013 | Egner-Walter et al. |
| 2013/0185889 A1 | 7/2013 | Tolentino et al. |
| 2013/0192015 A1 | 8/2013 | Tolentino et al. |
| 2013/0192016 A1 | 8/2013 | Kim et al. |
| 2013/0198992 A1 | 8/2013 | Tolentino et al. |
| 2013/0205532 A1 | 8/2013 | Tolentino et al. |
| 2013/0219649 A1 | 8/2013 | Tolentinto et al. |
| 2013/0227809 A1 | 9/2013 | Tolentinto et al. |
| 2013/0227810 A1 | 9/2013 | Tolentinto et al. |
| 2013/0247323 A1 | 9/2013 | Geubel et al. |
| 2013/0255026 A1 | 10/2013 | Depondt |
| 2013/0263400 A1 | 10/2013 | Duesterhoeft et al. |
| 2013/0291329 A1 | 11/2013 | Izabel |
| 2013/0298348 A1 | 11/2013 | Caillot et al. |
| 2013/0305475 A1 | 11/2013 | Kim et al. |
| 2013/0305478 A1 | 11/2013 | Kim et al. |
| 2013/0333145 A1 | 12/2013 | Depondt |
| 2013/0333146 A1 | 12/2013 | Depondt |
| 2014/0026348 A1 | 1/2014 | Schaeuble |
| 2014/0026349 A1 | 1/2014 | Schaeuble |
| 2014/0026350 A1 | 1/2014 | Boland |
| 2014/0068886 A1 | 3/2014 | Ku |
| 2014/0082875 A1 | 3/2014 | Peers et al. |
| 2014/0115811 A1 | 5/2014 | Kim et al. |
| 2014/0130287 A1 | 5/2014 | Bex et al. |
| 2014/0150198 A1 | 6/2014 | Kim et al. |
| 2014/0182075 A1 | 7/2014 | Polocoser et al. |
| 2014/0196241 A1 | 7/2014 | Kim et al. |
| 2014/0259504 A1 | 9/2014 | Piotrowski et al. |
| 2014/0259505 A1 | 9/2014 | Fournier et al. |
| 2014/0283325 A1 | 9/2014 | Kawashima et al. |
| 2014/0317875 A1 | 10/2014 | Tolentino et al. |
| 2014/0338144 A1 | 11/2014 | An et al. |
| 2014/0359963 A1 | 12/2014 | An et al. |
| 2014/0373301 A1 | 12/2014 | Kim et al. |
| 2015/0026908 A1 | 1/2015 | Izabel et al. |
| 2015/0047141 A1 | 2/2015 | Houssat et al. |
| 2015/0059116 A1 | 3/2015 | An et al. |
| 2015/0074935 A1 | 3/2015 | An et al. |
| 2015/0089764 A1 | 4/2015 | Wu |
| 2015/0135468 A1 | 5/2015 | Kim |
| 2015/0158463 A1 | 6/2015 | Yi |
| 2015/0166016 A1 | 6/2015 | Wang |
| 2015/0246659 A1 | 9/2015 | Park |
| 2015/0251636 A1 | 9/2015 | Kim et al. |
| 2015/0251637 A1 | 9/2015 | Tolentino et al. |
| 2015/0258965 A1 | 9/2015 | An |
| 2015/0274131 A1 | 10/2015 | Tolentinto et al. |
| 2015/0353054 A1 | 12/2015 | Tolentino et al. |
| 2016/0046263 A1 | 2/2016 | Tolentino et al. |
| 2016/0059828 A1 | 3/2016 | Tolentino et al. |
| 2016/0159323 A1 | 6/2016 | Tolentinto et al. |
| 2016/0280186 A1 | 9/2016 | Peers et al. |
| 2016/0375867 A1 | 12/2016 | Tolentino et al. |
| 2017/0057464 A1 | 3/2017 | Tolentinto et al. |
| 2017/0072912 A1 | 3/2017 | Tolentino et al. |
| 2017/0113656 A1 | 4/2017 | Tolentino |

FOREIGN PATENT DOCUMENTS

| | | |
|---|---|---|
| AU | 409933 | 2/1971 |
| AU | 409933 B2 | 2/1971 |
| AU | 410701 | 2/1971 |
| AU | 410701 B2 | 2/1971 |
| AU | 649730 | 6/1994 |
| AU | 649730 B2 | 6/1994 |
| AU | 729371 | 7/2001 |
| AU | 729371 C | 7/2001 |
| AU | 741730 | 12/2001 |
| AU | 741730 B2 | 12/2001 |
| AU | 762557 | 6/2003 |
| AU | 762557 B2 | 6/2003 |
| AU | 770944 | 3/2004 |
| AU | 770944 B2 | 3/2004 |
| AU | 2003257828 | 3/2004 |
| AU | 2003257828 A1 | 3/2004 |
| AU | 780818 | 4/2005 |
| AU | 780818 B2 | 4/2005 |
| AU | 2006100618 | 8/2006 |
| AU | 2006100618 A4 | 8/2006 |
| AU | 2006241297 | 6/2007 |
| AU | 2006241297 A1 | 6/2007 |
| AU | 2006203445 | 10/2007 |
| AU | 2006203445 A1 | 10/2007 |
| AU | 2008100641 | 8/2008 |
| AU | 2008100641 A4 | 8/2008 |
| AU | 2009238193 | 10/2009 |
| AU | 2009238193 A1 | 10/2009 |
| AU | 2009324257 | 8/2010 |
| AU | 2009324257 A1 | 8/2010 |
| AU | 2010294766 A1 | 2/2012 |
| BR | 8304484 | 4/1984 |
| BR | 8304484 A | 4/1984 |
| BR | 8604381 | 5/1987 |
| BR | 8604381 A | 5/1987 |
| BR | 8707390 | 11/1988 |
| BR | 8707390 A | 11/1988 |
| BR | 8903473 | 3/1990 |
| BR | 8903473 A | 3/1990 |
| BR | 8907154 | 2/1991 |
| BR | 8907154 A | 2/1991 |
| BR | 9005080 | 8/1991 |
| BR | 9005080 A | 8/1991 |
| BR | 9105809 | 8/1992 |
| BR | 9105809 A | 8/1992 |
| BR | 9200129 | 10/1992 |
| BR | 9200129 A | 10/1992 |
| BR | 0006164 | 4/2001 |
| BR | 0007263 | 10/2001 |
| BR | 0007263 A | 10/2001 |
| BR | 0106665 | 4/2002 |
| BR | 0106665 A | 4/2002 |
| BR | 0106667 | 4/2002 |
| BR | 0106667 A | 4/2002 |
| BR | 0306135 | 10/2004 |
| BR | 0306135 A | 10/2004 |
| BR | PI0411532 | 8/2006 |
| BR | PI0411532 A | 8/2006 |
| BR | PI0506158 | 10/2006 |
| BR | PI0506158 A | 10/2006 |
| BR | PI0007263 | 1/2009 |
| BR | PI0519259 | 1/2009 |
| BR | 0006164 B1 | 8/2009 |
| BR | 0006917 | 8/2009 |
| BR | 0006917 B1 | 8/2009 |
| BR | PI0606903 | 8/2009 |
| BR | PI0606903 A2 | 8/2009 |
| BR | PI0901324 | 4/2010 |
| BR | PI0006963 | 9/2010 |
| BR | PI0706762 | 4/2011 |
| BR | PI0706762 A2 | 4/2011 |
| BR | PI1000961 | 6/2011 |
| BR | PI0621265 A2 | 12/2011 |
| BR | PI0621265 | 12/2011 |
| CA | 954258 | 9/1974 |
| CA | 966609 | 4/1975 |
| CA | 1038117 | 9/1978 |
| CA | 1075414 | 4/1980 |
| CA | 1124462 | 6/1982 |
| CA | 1184712 | 4/1985 |
| CA | 1257059 | 7/1989 |
| CA | 1263803 | 12/1989 |
| CA | 2027227 | 4/1991 |
| CA | 1289308 | 9/1991 |
| CA | 2037400 | 2/1992 |
| CA | 2093956 | 4/1992 |
| CA | 2079846 | 7/1993 |
| CA | 2118874 | 9/1994 |
| CA | 2156345 | 2/1996 |
| CA | 2174030 | 5/1997 |
| CA | 2260175 | 1/1998 |
| CA | 2220462 | 7/1998 |
| CA | 2243143 | 1/1999 |
| CA | 2344888 | 4/2000 |

(56) References Cited

FOREIGN PATENT DOCUMENTS

| | | |
|---|---|---|
| CA | 2414099 | 1/2002 |
| CA | 2472914 | 8/2003 |
| CA | 2487799 | 12/2003 |
| CA | 2500891 A1 | 4/2004 |
| CA | 2515071 | 8/2004 |
| CA | 2515071 A1 | 8/2004 |
| CA | 2242776 | 7/2005 |
| CA | 2553977 | 9/2005 |
| CA | 2554048 A1 | 9/2005 |
| CA | 2514372 | 1/2006 |
| CA | 2574330 | 2/2006 |
| CA | 2523315 | 4/2006 |
| CA | 2541641 | 4/2006 |
| CA | 2522729 | 6/2006 |
| CA | 2598104 | 9/2006 |
| CA | 2550409 | 11/2006 |
| CA | 2568561 | 5/2007 |
| CA | 2569175 | 5/2007 |
| CA | 2569176 | 5/2007 |
| CA | 2569977 | 6/2007 |
| CA | 2560155 | 9/2007 |
| CA | 2645821 | 10/2007 |
| CA | 2649474 | 11/2007 |
| CA | 2649760 | 11/2007 |
| CA | 2651069 | 11/2007 |
| CA | 2590443 | 4/2008 |
| CA | 2631513 | 5/2008 |
| CA | 2574242 | 7/2008 |
| CA | 2617013 | 11/2008 |
| CA | 2628517 | 4/2009 |
| CA | 2671767 | 1/2010 |
| CA | 2500891 | 5/2011 |
| CA | 2789431 | 8/2011 |
| CA | 2789431 A1 | 8/2011 |
| CA | 2809243 | 3/2012 |
| CA | 2809243 A1 | 3/2012 |
| CA | 2809292 | 3/2012 |
| CA | 2809292 A1 | 3/2012 |
| CA | 2809947 | 3/2012 |
| CA | 2809947 A1 | 3/2012 |
| CA | 2831801 A1 | 10/2012 |
| CA | 2835703 | 11/2012 |
| CA | 2835703 A1 | 11/2012 |
| CA | 2843527 | 1/2013 |
| CA | 2843527 A1 | 1/2013 |
| CA | 2843637 | 2/2013 |
| CA | 2843637 A1 | 2/2013 |
| CA | 2843644 | 2/2013 |
| CA | 2843644 A1 | 2/2013 |
| CA | 2797693 | 5/2013 |
| CA | 2797693 A1 | 5/2013 |
| CA | 147027 S | 6/2013 |
| CA | 147028 S | 6/2013 |
| CA | 2799267 | 6/2013 |
| CA | 2799267 A1 | 6/2013 |
| CA | 2740384 | 7/2013 |
| CA | 2740384 C | 7/2013 |
| CA | 2865292 A1 | 8/2013 |
| CA | 2906863 A1 | 9/2014 |
| CA | 2898928 A1 | 1/2017 |
| CA | 2865295 C | 3/2017 |
| CL | 2014002239 A1 | 5/2015 |
| CL | 2014002241 A1 | 5/2015 |
| CL | 2015002693 A1 | 4/2016 |
| CN | 101983148 | 3/2011 |
| CN | 101983148 A | 3/2011 |
| CN | 202593459 | 12/2012 |
| CN | 202593459 U | 12/2012 |
| CN | 102963337 | 3/2013 |
| CN | 102963337 A | 3/2013 |
| CN | 102991462 | 3/2013 |
| CN | 102991462 A | 3/2013 |
| CN | 102991466 | 3/2013 |
| CN | 102991466 A | 3/2013 |
| CN | 103101514 | 5/2013 |
| CN | 103101514 A | 5/2013 |
| CN | 103101516 | 5/2013 |
| CN | 103101516 A | 5/2013 |
| CN | 103108782 | 5/2013 |
| CN | 103108782 A | 5/2013 |
| CN | 103183008 | 7/2013 |
| CN | 103183008 A | 7/2013 |
| CN | 103183009 | 7/2013 |
| CN | 103183009 A | 7/2013 |
| CN | 103223923 | 7/2013 |
| CN | 103223923 A | 7/2013 |
| CN | 103228498 | 7/2013 |
| CN | 103228498 A | 7/2013 |
| CO | 7141449 A2 | 12/2014 |
| CO | 7141460 A2 | 12/2014 |
| DE | 2309063 | 8/1974 |
| DE | 2311293 | 9/1974 |
| DE | 2353368 | 5/1975 |
| DE | 3222864 | 12/1983 |
| DE | 3919050 A1 | 12/1990 |
| DE | 4439275 A1 | 5/1995 |
| DE | 19650929 | 6/1998 |
| DE | 19734843 | 2/1999 |
| DE | 19745460 | 4/1999 |
| DE | 19814609 | 10/1999 |
| DE | 10054287 | 5/2002 |
| DE | 10228494 A1 | 1/2004 |
| DE | 10320930 | 11/2004 |
| DE | 10343571 A1 | 4/2005 |
| DE | 102004019157 | 11/2005 |
| DE | 102004061088 | 6/2006 |
| DE | 102005019389 | 11/2006 |
| DE | 102005062462 A1 | 6/2007 |
| DE | 102006057024 | 6/2008 |
| DE | 102007030169 | 1/2009 |
| DE | 102007051549 | 4/2009 |
| DE | 102008042516 | 5/2009 |
| DE | 102008001045 | 10/2009 |
| DE | 102008021457 | 11/2009 |
| DE | 102008002447 | 12/2009 |
| DE | 102008049269 | 4/2010 |
| DE | 102008049270 | 4/2010 |
| DE | 102009000483 | 4/2010 |
| DE | 102009001025 | 8/2010 |
| DE | 102010012983 | 2/2011 |
| DE | 102009029469 | 3/2011 |
| DE | 102009029470 | 3/2011 |
| DE | 102009048212 | 4/2011 |
| DE | 102010016348 | 4/2011 |
| DE | 102010041152 A1 | 5/2011 |
| DE | 102010003269 | 9/2011 |
| DE | 202011005213 | 9/2011 |
| DE | 202011100429 | 9/2011 |
| DE | 102010003645 | 10/2011 |
| DE | 102010028102 | 10/2011 |
| DE | 102010029107 | 11/2011 |
| DE | 102010030880 | 1/2012 |
| DE | 102010039526 | 2/2012 |
| EA | 2293034 | 2/2007 |
| EP | 0594451 | 4/1994 |
| EP | 0633170 | 1/1995 |
| EP | 0665143 A1 | 8/1995 |
| EP | 0683703 | 11/1995 |
| EP | 0695246 | 2/1996 |
| EP | 0749378 | 12/1996 |
| EP | 0757636 | 2/1997 |
| EP | 0760761 | 3/1997 |
| EP | 0777594 | 6/1997 |
| EP | 0792704 | 9/1997 |
| EP | 0810936 | 12/1997 |
| EP | 0828638 | 3/1998 |
| EP | 0841229 | 5/1998 |
| EP | 0847346 | 6/1998 |
| EP | 0847347 | 6/1998 |
| EP | 0853561 | 7/1998 |
| EP | 0853563 | 7/1998 |
| EP | 0853565 | 7/1998 |
| EP | 0885791 A1 | 12/1998 |
| EP | 0914269 | 5/1999 |

(56) References Cited

FOREIGN PATENT DOCUMENTS

| | | |
|---|---|---|
| EP | 0926028 | 6/1999 |
| EP | 0930991 | 7/1999 |
| EP | 0935546 | 8/1999 |
| EP | 0943511 | 9/1999 |
| EP | 1022202 | 7/2000 |
| EP | 1037778 | 9/2000 |
| EP | 0783998 | 10/2000 |
| EP | 1056628 | 12/2000 |
| EP | 1098795 | 5/2001 |
| EP | 1098796 | 5/2001 |
| EP | 1109706 | 6/2001 |
| EP | 1119475 | 8/2001 |
| EP | 1119476 | 8/2001 |
| EP | 1178907 | 2/2002 |
| EP | 1197406 | 4/2002 |
| EP | 1243489 | 9/2002 |
| EP | 1247707 | 10/2002 |
| EP | 1257445 | 11/2002 |
| EP | 1289804 | 3/2003 |
| EP | 1289806 | 3/2003 |
| EP | 1294596 | 3/2003 |
| EP | 1337420 | 8/2003 |
| EP | 1412235 | 4/2004 |
| EP | 1017514 | 6/2004 |
| EP | 1425204 | 6/2004 |
| EP | 1436179 A1 | 7/2004 |
| EP | 1448414 | 8/2004 |
| EP | 1462327 | 9/2004 |
| EP | 1485279 | 12/2004 |
| EP | 1494901 | 1/2005 |
| EP | 1494902 | 1/2005 |
| EP | 1501710 | 2/2005 |
| EP | 1519862 | 4/2005 |
| EP | 1547883 | 6/2005 |
| EP | 1612113 | 1/2006 |
| EP | 1312522 | 4/2006 |
| EP | 1666319 | 6/2006 |
| EP | 1708911 A1 | 10/2006 |
| EP | 1719673 | 11/2006 |
| EP | 1733939 | 12/2006 |
| EP | 1740424 | 1/2007 |
| EP | 1744940 | 1/2007 |
| EP | 1753646 | 2/2007 |
| EP | 1758772 | 3/2007 |
| EP | 1769987 | 4/2007 |
| EP | 1792794 | 6/2007 |
| EP | 1799518 | 6/2007 |
| EP | 1800977 | 6/2007 |
| EP | 1800978 | 6/2007 |
| EP | 1833708 A1 | 9/2007 |
| EP | 1846274 | 10/2007 |
| EP | 1849666 A1 | 10/2007 |
| EP | 1937524 A1 | 7/2008 |
| EP | 2015971 | 1/2009 |
| EP | 2050638 | 4/2009 |
| EP | 2079617 | 7/2009 |
| EP | 2109557 | 10/2009 |
| EP | 2113432 | 11/2009 |
| EP | 2127969 | 12/2009 |
| EP | 2134576 | 12/2009 |
| EP | 2138363 A1 | 12/2009 |
| EP | 2143603 | 1/2010 |
| EP | 2146877 | 1/2010 |
| EP | 2177406 A2 | 4/2010 |
| EP | 2230140 | 9/2010 |
| EP | 2236364 A1 | 10/2010 |
| EP | 2236366 | 10/2010 |
| EP | 2253520 | 11/2010 |
| EP | 2258592 | 12/2010 |
| EP | 1559623 | 1/2011 |
| EP | 2300283 A1 | 3/2011 |
| EP | 2321160 | 5/2011 |
| EP | 2338747 | 6/2011 |
| EP | 2426017 | 3/2012 |
| EP | 002088146-0001 A1 | 8/2012 |
| EP | 002088146-0002 A1 | 8/2012 |
| EP | 2532558 A2 | 12/2012 |
| EP | 2551157 A1 | 1/2013 |
| EP | 2560847 A1 | 2/2013 |
| EP | 2571733 A1 | 3/2013 |
| EP | 2578458 A1 | 4/2013 |
| EP | 2421729 B1 | 3/2014 |
| EP | 2817183 A1 | 12/2014 |
| EP | 2817184 A1 | 12/2014 |
| EP | 002674887-0001 A1 | 2/2015 |
| EP | 2969671 A1 | 1/2016 |
| FR | 2437959 A1 | 4/1980 |
| FR | 2736025 A1 | 1/1997 |
| FR | 2738201 A1 | 3/1997 |
| FR | 2744973 A1 * | 8/1997 ............ B60S 1/3801 |
| FR | 2747976 | 10/1997 |
| FR | 2804392 A1 | 8/2001 |
| FR | 2879987 | 6/2006 |
| FR | 2957877 | 9/2011 |
| GB | 1395918 | 5/1975 |
| GB | 1405579 | 9/1975 |
| GB | 2188672 | 10/1987 |
| GB | 2220844 A | 1/1990 |
| GB | 2324237 | 10/1998 |
| GB | 2348118 A | 9/2000 |
| HK | 1110560 | 5/2010 |
| HK | 1110560 A1 | 5/2010 |
| HK | 1105928 | 8/2010 |
| HK | 1105928 A1 | 8/2010 |
| HK | 1108573 | 10/2011 |
| HK | 1108573 A1 | 10/2011 |
| HK | 1110561 | 7/2012 |
| HK | 1110561 A1 | 7/2012 |
| JP | 60092136 A | 5/1985 |
| JP | 60092136 A | 2/1986 |
| JP | 0374242 A | 3/1991 |
| JP | 3572527 B2 | 10/2004 |
| JP | 2008037388 A | 2/2008 |
| KR | 10-089115 | 2/2009 |
| KR | 10-0891195 B1 | 4/2009 |
| KR | 20120029616 A | 3/2012 |
| MX | 169141 | 6/1993 |
| MX | 9708272 | 8/1998 |
| MX | 9708273 | 8/1998 |
| MX | PA03010189 | 3/2004 |
| MX | PA03010190 | 3/2004 |
| MX | PA05002760 | 6/2005 |
| MX | PA05002988 | 6/2005 |
| MX | PA05008266 | 9/2005 |
| MX | PA05005581 | 11/2005 |
| MX | PA06008594 | 8/2006 |
| MX | PA06008594 A | 8/2006 |
| MX | 2007007828 | 7/2007 |
| MX | 2007007829 | 7/2007 |
| MX | 2008012325 | 10/2008 |
| MX | 2008013480 | 10/2008 |
| MX | 2008013814 | 12/2008 |
| MX | 2008014163 | 2/2009 |
| MX | 2009013050 | 1/2010 |
| MX | 2009013051 | 1/2010 |
| MX | 2010009333 | 10/2010 |
| MX | 2011000597 | 3/2011 |
| MX | 2011000598 | 3/2011 |
| MX | 2011003242 | 4/2011 |
| MX | 2011003243 | 4/2011 |
| MX | 2011003911 | 9/2011 |
| MX | 2012002314 | 6/2012 |
| MX | 2012002314 A | 6/2012 |
| MX | 2013002710 | 5/2013 |
| MX | 2013002710 A | 5/2013 |
| MX | 2013006881 | 7/2013 |
| MX | 2013006881 A | 7/2013 |
| MX | 2014001106 A | 3/2014 |
| MX | 2013011449 A | 6/2014 |
| MX | 2013006260 A | 7/2014 |
| MX | 2014001162 A | 7/2014 |
| MX | 2014001161 A | 11/2014 |
| MX | 2014010123 A | 11/2014 |
| MX | 2014010122 A | 5/2015 |

(56) References Cited

FOREIGN PATENT DOCUMENTS

| | | |
|---|---|---|
| MX | 2015013210 A | 12/2015 |
| MY | 122308 | 4/2006 |
| MY | 122308 A | 4/2006 |
| MY | 122563 | 4/2006 |
| MY | 122563 A | 4/2006 |
| MY | 128028 | 1/2007 |
| MY | 128028 A | 1/2007 |
| MY | 128970 | 3/2007 |
| MY | 128970 A | 3/2007 |
| PT | 1800978 | 5/2011 |
| PT | 1800977 | 1/2012 |
| PT | 1800977 E | 1/2012 |
| RU | 2238198 | 10/2004 |
| RU | 2251500 | 5/2005 |
| RU | 2260527 | 9/2005 |
| RU | 2260528 | 9/2005 |
| RU | 2268176 | 1/2006 |
| RU | 2271287 | 3/2006 |
| RU | 2294291 | 2/2007 |
| RU | 2007127898 | 1/2009 |
| RU | 80415 | 2/2009 |
| RU | 2346834 | 2/2009 |
| RU | 2369500 | 10/2009 |
| RU | 2381120 | 2/2010 |
| RU | 2394706 | 7/2010 |
| RU | 2416536 C1 | 4/2011 |
| RU | 105237 | 6/2011 |
| RU | 108350 | 9/2011 |
| RU | 108741 | 9/2011 |
| RU | 2456180 C2 | 7/2012 |
| RU | 2493033 C2 | 9/2013 |
| RU | 2526773 C2 | 8/2014 |
| RU | 2543448 C2 | 2/2015 |
| RU | 2560217 C2 | 8/2015 |
| RU | 2560954 C2 | 8/2015 |
| RU | 2561173 C2 | 8/2015 |
| RU | 2577830 C1 | 3/2016 |
| RU | 2577981 C1 | 3/2016 |
| RU | 2578001 C2 | 3/2016 |
| RU | 2015144362 A | 4/2017 |
| TW | M404153 U | 5/2011 |
| TW | M404153 U1 | 5/2011 |
| TW | 201325952 | 7/2013 |
| TW | 201325952 A | 7/2013 |
| TW | 201325953 | 7/2013 |
| TW | 201325953 A | 7/2013 |
| WO | WO 81/03308 | 11/1981 |
| WO | WO 91/06451 | 5/1991 |
| WO | WO 92/06869 | 4/1992 |
| WO | WO 97/12787 | 4/1997 |
| WO | WO 98/01328 | 1/1998 |
| WO | WO 98/01329 | 1/1998 |
| WO | WO 98/50261 | 11/1998 |
| WO | WO 98/51203 | 11/1998 |
| WO | WO 98/51550 | 11/1998 |
| WO | WO 99/08818 | 2/1999 |
| WO | WO 99/15382 | 4/1999 |
| WO | WO 99/56992 | 11/1999 |
| WO | WO 00/05111 | 2/2000 |
| WO | WO 00/06431 | 2/2000 |
| WO | WO 00/21808 | 4/2000 |
| WO | WO 00/21809 | 4/2000 |
| WO | WO 00/21811 | 4/2000 |
| WO | WO 00/38963 | 7/2000 |
| WO | WO 00/38964 | 7/2000 |
| WO | WO 00/53470 | 9/2000 |
| WO | WO 0061409 | 10/2000 |
| WO | WO 01/26942 | 4/2001 |
| WO | WO 01/30618 | 5/2001 |
| WO | WO 01/40034 | 6/2001 |
| WO | WO 01/49537 | 7/2001 |
| WO | WO 01/58732 | 8/2001 |
| WO | WO 01/62559 | 8/2001 |
| WO | WO 01/89890 | 11/2001 |
| WO | WO 01/89891 | 11/2001 |
| WO | WO 01/89892 | 11/2001 |
| WO | WO 01/94166 | 12/2001 |
| WO | WO 02/04168 | 1/2002 |
| WO | WO 02/04266 | 1/2002 |
| WO | WO 02/04267 | 1/2002 |
| WO | WO 02/04268 | 1/2002 |
| WO | WO 02/34590 | 5/2002 |
| WO | WO 02/34596 | 5/2002 |
| WO | WO 02/34597 | 5/2002 |
| WO | WO 02/40328 | 5/2002 |
| WO | WO 02/40329 | 5/2002 |
| WO | WO 02/051677 | 7/2002 |
| WO | WO 02/052917 | 7/2002 |
| WO | WO 02/066301 | 8/2002 |
| WO | WO 02/090155 | 11/2002 |
| WO | WO 02/090156 | 11/2002 |
| WO | WO 03/026938 | 4/2003 |
| WO | WO 03/033316 | 4/2003 |
| WO | WO 03/042017 | 5/2003 |
| WO | WO 03/045746 | 6/2003 |
| WO | WO 03/091078 | 11/2003 |
| WO | WO 03/101794 | 12/2003 |
| WO | WO 03/106233 | 12/2003 |
| WO | WO 2004/002792 | 1/2004 |
| WO | WO 2004/045927 | 6/2004 |
| WO | WO 2004/045928 | 6/2004 |
| WO | WO 2004/048163 | 6/2004 |
| WO | WO 2004/056625 | 7/2004 |
| WO | WO 2004/069617 | 8/2004 |
| WO | WO 2004/076251 | 9/2004 |
| WO | WO 2004/098962 | 11/2004 |
| WO | WO 2004/098963 | 11/2004 |
| WO | WO 2004/110833 | 12/2004 |
| WO | WO 2005/025956 | 3/2005 |
| WO | WO 2005/039944 | 5/2005 |
| WO | WO 2008/051483 | 5/2005 |
| WO | WO 2005/054017 | 6/2005 |
| WO | WO 2005/080160 | 9/2005 |
| WO | WO 2005/082691 | 9/2005 |
| WO | WO 2005/087560 | 9/2005 |
| WO | WO 2005/092680 | 10/2005 |
| WO | WO 2005/102801 | 11/2005 |
| WO | WO 2005/115813 | 12/2005 |
| WO | WO 2005/123471 | 12/2005 |
| WO | WO 2006/000393 | 1/2006 |
| WO | WO 2006/013152 | 2/2006 |
| WO | WO 2006/040259 | 4/2006 |
| WO | WO 2006/048355 | 5/2006 |
| WO | WO 2006/061284 | 6/2006 |
| WO | WO 2006/069648 | 7/2006 |
| WO | WO 2006/074995 | 7/2006 |
| WO | WO 2006/079591 | 8/2006 |
| WO | WO 2006/081893 | 8/2006 |
| WO | WO 2006/106006 | 10/2006 |
| WO | WO 2006/106109 | 10/2006 |
| WO | 2006119679 A1 | 11/2006 |
| WO | WO 2006/114355 | 11/2006 |
| WO | WO 2006/117081 | 11/2006 |
| WO | WO 2006/117085 | 11/2006 |
| WO | WO 2006/117308 | 11/2006 |
| WO | WO 2007/009885 | 1/2007 |
| WO | WO 2007/014389 | 2/2007 |
| WO | WO 2007/014395 | 2/2007 |
| WO | WO 2007/035288 | 3/2007 |
| WO | WO 2007/042377 | 4/2007 |
| WO | WO 2007/045549 | 4/2007 |
| WO | WO 2007/071487 | 6/2007 |
| WO | WO 2007/073974 | 7/2007 |
| WO | WO 2007/102404 | 9/2007 |
| WO | WO 2007/122095 | 11/2007 |
| WO | WO 2007/128677 | 11/2007 |
| WO | WO 2008/003633 | 1/2008 |
| WO | WO 2008/043622 | 4/2008 |
| WO | WO 2008/076402 | 6/2008 |
| WO | WO 2008/122453 | 10/2008 |
| WO | WO 2008/124113 | 10/2008 |
| WO | WO 2008/135308 | 11/2008 |
| WO | WO 2009/000498 | 12/2008 |
| WO | WO 2009/115494 | 9/2009 |

(56) References Cited

FOREIGN PATENT DOCUMENTS

| | | |
|---|---|---|
| WO | WO 2009/121849 | 10/2009 |
| WO | WO 2009/124792 | 10/2009 |
| WO | WO 2009/132982 | 11/2009 |
| WO | WO 2009/153097 | 12/2009 |
| WO | WO 2009/155230 | 12/2009 |
| WO | WO 2010/016000 | 2/2010 |
| WO | 2010033646 A2 | 3/2010 |
| WO | WO 2010/028866 | 3/2010 |
| WO | WO 2010/028918 | 3/2010 |
| WO | WO 2010033646 | 3/2010 |
| WO | WO 2010/034445 | 4/2010 |
| WO | WO 2010/034447 | 4/2010 |
| WO | WO 2010/035794 | 4/2010 |
| WO | WO 2010/091757 | 8/2010 |
| WO | WO 2010/098877 | 9/2010 |
| WO | WO 2010/112579 | 10/2010 |
| WO | WO 2010/121665 | 10/2010 |
| WO | 2010127888 A1 | 11/2010 |
| WO | WO 2011/032753 | 3/2011 |
| WO | WO 2011/032760 | 3/2011 |
| WO | WO 2011/040743 | 4/2011 |
| WO | WO 2011/060979 | 5/2011 |
| WO | WO 2011/116995 | 9/2011 |
| WO | WO 2011/120723 | 10/2011 |
| WO | WO 2011/124404 | 10/2011 |
| WO | WO 2011/131395 | 10/2011 |
| WO | WO 2011/144400 | 11/2011 |
| WO | WO 2011/157465 | 12/2011 |
| WO | WO 2012/001175 | 1/2012 |
| WO | WO 2012/014054 | 2/2012 |
| WO | WO 2012/033363 | 3/2012 |
| WO | 2013/016493 A1 | 1/2013 |
| WO | 2013/019645 A1 | 2/2013 |
| WO | 2013/019723 A1 | 2/2013 |
| WO | 2013089312 A1 | 6/2013 |
| WO | 2013/126907 A1 | 8/2013 |
| WO | 2013/126910 A1 | 8/2013 |
| WO | 13176352 A1 | 11/2013 |
| WO | 2014/145538 A1 | 9/2014 |
| WO | 2016/160687 A1 | 10/2016 |
| WO | 2017/075066 A1 | 5/2017 |
| ZA | 199710009 | 5/1999 |
| ZA | 199806123 | 1/2000 |
| ZA | 199806124 | 1/2000 |
| ZA | 199806125 | 1/2000 |
| ZA | 199807523 | 2/2000 |
| ZA | 200006220 B | 7/2001 |

OTHER PUBLICATIONS

International Search Report dated Sep. 19, 2012 for PCT/US2012/048617 filed Jul. 27, 2012.
International Search Report dated Sep. 19, 2012 for PCT/US2012/048262 filed Jul. 26, 2012.
Non-Final Rejection towards U.S. Appl. No. 13/453,601 dated Jul. 9, 2013.
Non-Final Rejection towards U.S. Appl. No. 13/453,601 dated Jan. 10, 2014.
Final Rejection towards U.S. Appl. No. 13/453,601 dated Aug. 1, 2014.
Non-Final Rejection towards U.S. Appl. No. 13/453601 dated Feb. 4, 2015.
Final Rejection towards U.S. Appl. No. 13/453,601 dated Jun. 3 2015.
Non-Final Rejection towards U.S. Appl. No. 13/453,601 dated Jan. 8 2016.
Notice of Allowance towards U.S. Appl. No. 13/453,601 dated May 20, 2016.
Non-Final Rejection towards U.S. Appl. No. 13/558,624 dated May 16, 2014.
Final Rejection towards U.S. Appl. No. 13/558,624 dated Sep. 29, 2014.
Non-Final Rejection towards U.S. Appl. No. 13/558,624 dated Mar. 6, 2015.
Notice of Allowance towards U.S. Appl. No. 13/558,624 dated Jun. 29, 2015.
Non-Final Rejection towards U.S. Appl. No. 13/560,585 dated Jul. 29, 2014.
Final Rejection towards U.S. Appl. No. 13/560,585 dated Jan. 28, 2015.
Non-Final Rejection towards U.S. Appl. No. 13/560,585 dated Jun. 24, 2015.
Notice of Allowance towards U.S. Appl. No. 13/560,585 dated Mar. 22, 2016.
Non-Final Rejection towards U.S. Appl. No. 13/679,646 dated Feb. 2, 2015.
Final Rejection towards U.S. Appl. No. 13/679,646 dated Sep. 2, 2015.
Non-Final Rejection towards U.S. Appl. No. 13/679,646 dated Jun. 13, 2016.
Non-Final Rejection towards U.S. Appl. No. 13/679,646 dated Jan. 4, 2017.
Non-Final Rejection towards U.S. Appl. No. 13/572,100 dated Jun. 3, 2014.
Non-Final Rejection towards U.S. Appl. No. 13/587,389 dated Oct. 31, 2014.
Final Rejection towards U.S. Appl. No. 13/587,389 dated Feb. 25, 2015.
Notice of Allowance towards U.S. Appl. No. 13/587,389 dated Jun. 19, 2015.
Non-Final Rejection towards U.S. Appl. No. 14/928,467 dated Apr. 28, 2016.
Final Rejection towards U.S. Appl. No. 14/928,467 dated Sep. 14, 2016.
Non-Final Rejection towards U.S. Appl. No. 13/194,070 dated Apr. 8, 2013.
Final Rejection towards U.S. Appl. No. 13/194,070 dated Aug. 27, 2013.
Non-Final Rejection towards U.S. Appl. No. 13/194,070 dated Dec. 26, 2013.
Notice of Allowance towards U.S. Appl. No. 13/194,070 dated Apr. 18, 2014.
Non-Final Rejection towards U.S. Appl. No. 14/329,423 dated Sep. 10, 2014.
Notice of Allowance towards U.S. Appl. No. 14/329,423 dated Apr. 15, 2015.
i Non-Final Rejection towards U.S. Appl. No. 29/413,428 dated Nov. 7, 2012.
Notice of Allowance towards U.S. Appl. No. 29/413,428 dated Jun. 14, 2013.
Notice of Allowance towards U.S. Appl. No. 29/413,430 dated Nov. 26, 2012.
Non-Final Rejection towards U.S. Appl. No. 29/375,477 dated Sep. 7, 2012.
Notice of Allowance towards U.S. Appl. No. 29/375,477 dated Jan. 15, 2014.
Notice of Allowance towards U.S. Appl. No. 29/429,262 dated Jun. 27, 2013.
Non-Final Rejection towards U.S. Appl. No. 14/035,610 dated Apr. 22, 2016.
Final Rejection towards U.S. Appl. No. 14/035,610 dated Aug. 5, 2016.
Non-Final Rejection towards U.S. Appl. No. 14/035,610 dated Dec. 30, 2016.
Non-Final Rejection towards U.S. Appl. No. 13/776,376 dated Nov. 18, 2014.
Non-Final Rejection towards U.S. Appl. No. 13/840,256 dated Nov. 26, 2014.
Non-Final Rejection towards U.S. Appl. No. 14/715,180 dated Jan. 7, 2016.
Final Rejection towards U.S. Appl. No. 14/715,180 dated Aug. 16, 2016.
Definition of rectangular in Oxford Dictionary 2017.
Non-Final Rejection towards U.S. Appl. No. 14/715,180 dated May 22, 2017.

(56) References Cited

OTHER PUBLICATIONS

Non-Final Rejection towards U.S. Appl. No. 14/721,476 dated May 16, 2017.
International Search Report and Written Opinion issued in PCT Application No. PCT/US2013/027684 dated Apr. 29, 2013.
International Search Report and Written Opinion issued in PCT Application No. PCT/US2014/030329 dated Jun. 3, 2014.
First Office Action issued in connection with CA Application No. 2865292 dated Aug. 25, 2015.
Second Office Action issued in connection with CA Application No. 2865292 dated Aug. 15, 2016.
Non-Final Rejection towards U.S. Appl. No. 13/776,383 dated Mar. 10, 2015.
Final Rejection towards U.S. Appl. No. 13/776,383 dated Aug. 14, 2015.
International Search Report and Written Opinion issued in PCT Application No. PCT/US2013/027688 dated Apr. 25, 2013.
First Office Action issued in connection with CA Application No. 2865295 dated Aug. 25, 2015.
Non-Final Rejection towards U.S. Appl. No. 14/216,082 dated Apr. 12, 2017.
Non-Final Rejection towards U.S. Appl. No. 14/200,792 dated Oct. 23, 2015.
Final Rejection towards U.S. Appl. No. 14/200,792 dated Feb. 23, 2016.
Notice of Allowance issued towards U.S. Appl. No. 14/200,792 dated Jul. 22, 2016.
Non-Final Rejection towards U.S. Appl. No. 15/359,271 dated May 11, 2017.
Notice of Allowance issued towards U.S. Appl. No. 29/504,287 dated Sep. 12, 2016.
Non-Final Rejection towards U.S. Appl. No. 29/504,292 dated Jun. 19, 2015.
Final Rejection towards U.S. Appl. No. 29/504,292 dated Jan. 20, 2016.
Advisory Action towards U.S. Appl. No. 29/504,292 dated May 19, 2016.
Notice of Allowance issued towards U.S. Appl. No. 29/504,292 dated Aug. 16, 2016.
International Search Report and Written Opinion issued in PCT Application No. PCT/US2016/024490 dated Jun. 21, 2016.
Notice of Allowance issued towards U.S. Appl. No. 29/525,746 dated Apr. 7, 2016.
Notice of Allowance issued towards U.S. Appl. No. 29/571,419 dated Jan. 31, 2017.
Notice of Allowance issued towards U.S. Appl. No. 29/571,424 dated Feb. 1, 2017.
International Search Report and Written Opinion issued in PCT Application No. PCT/US2016/058887 dated Jan. 3, 2017.

\* cited by examiner

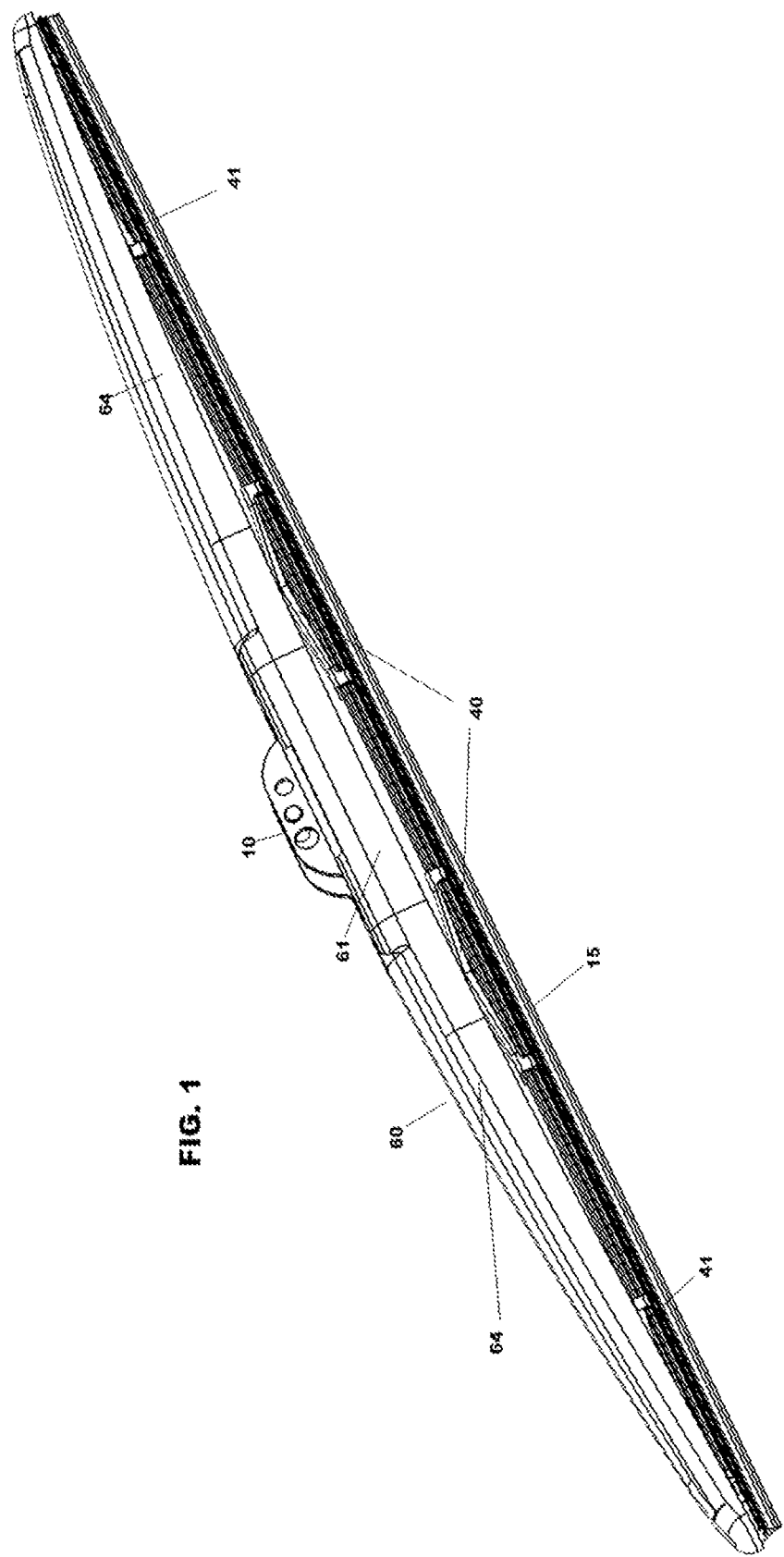

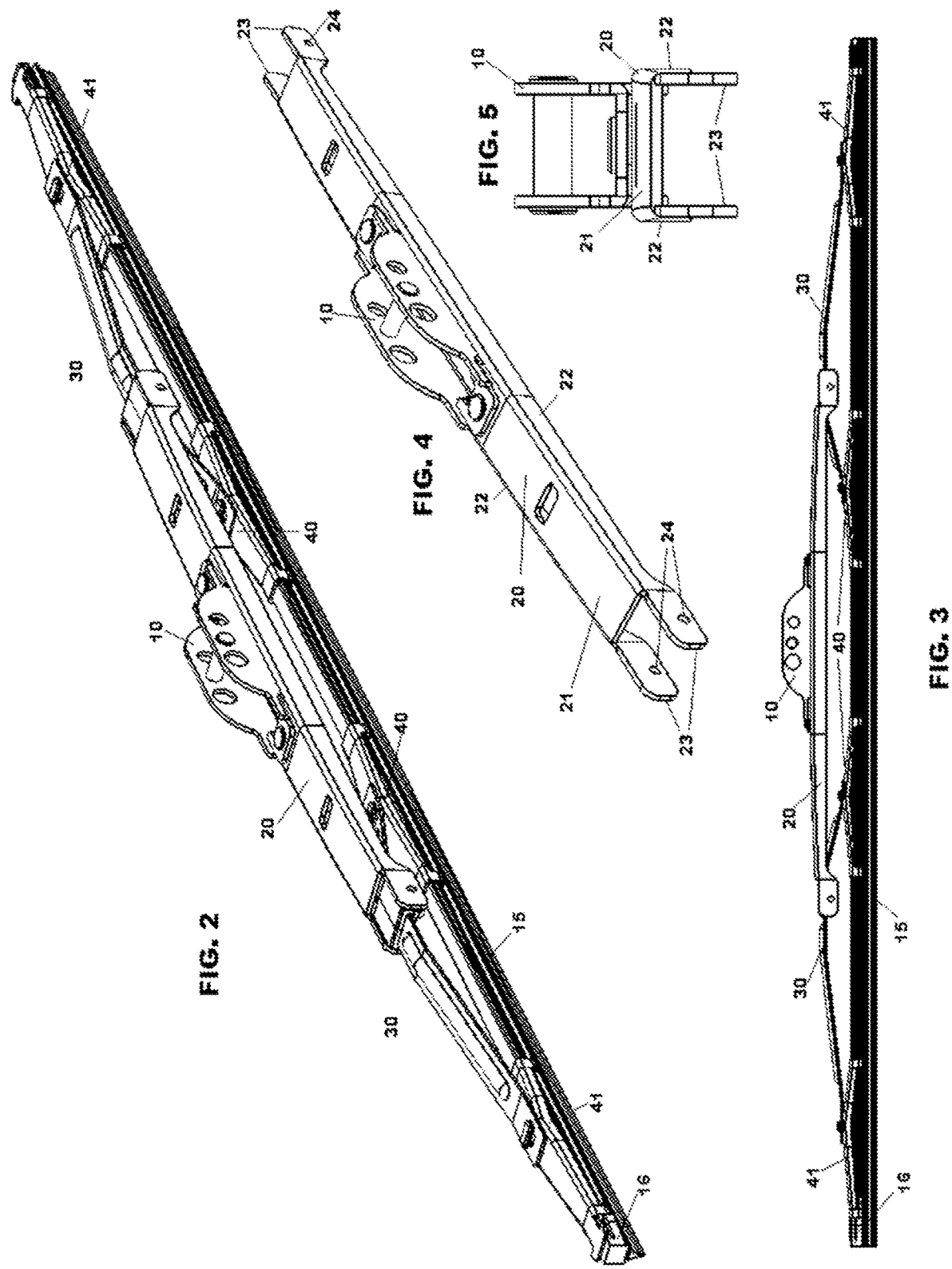

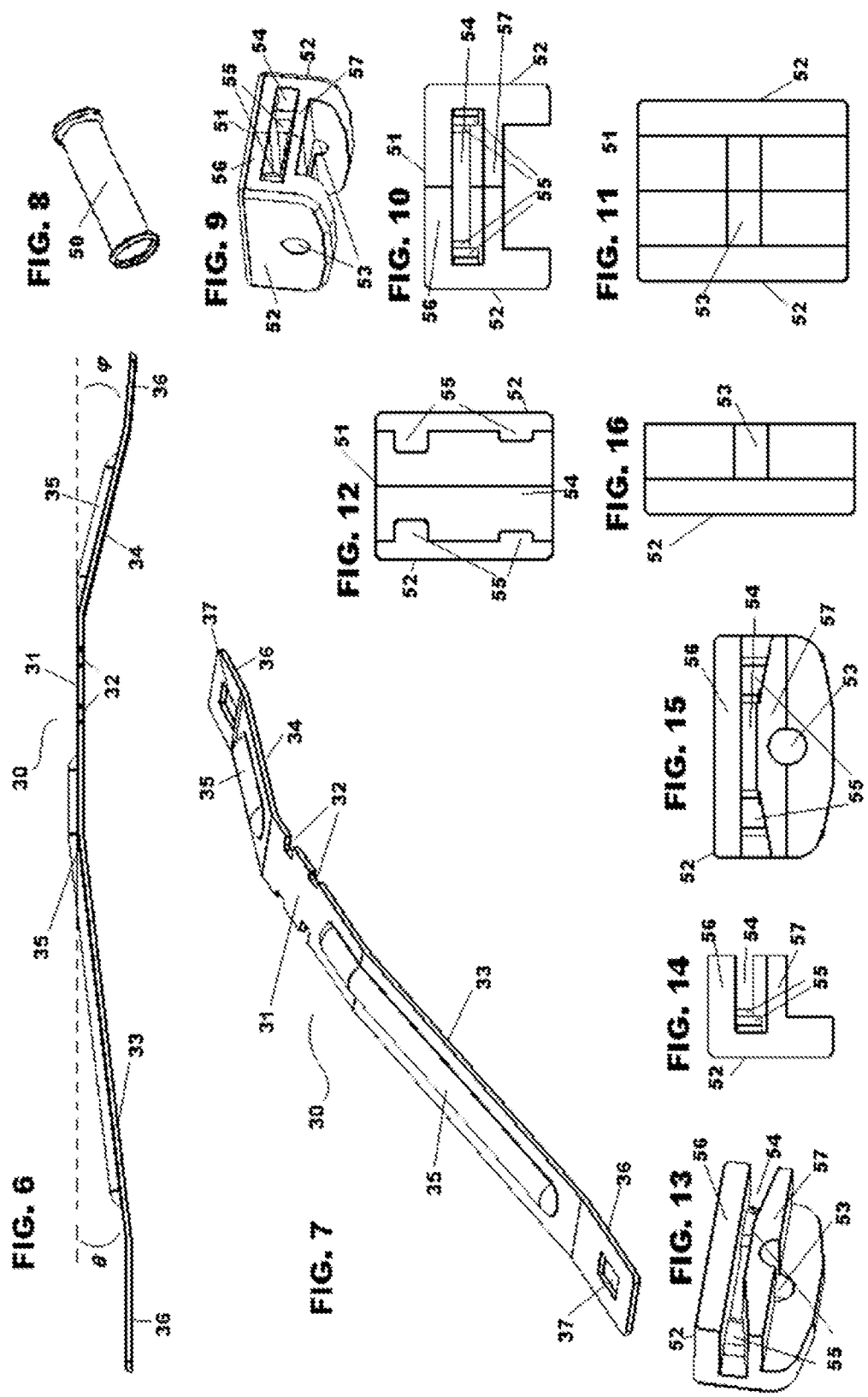

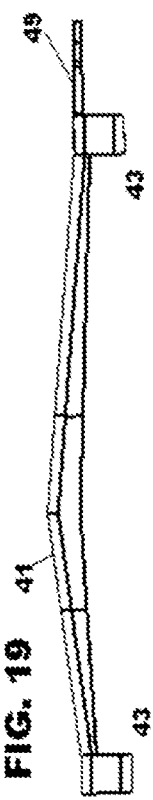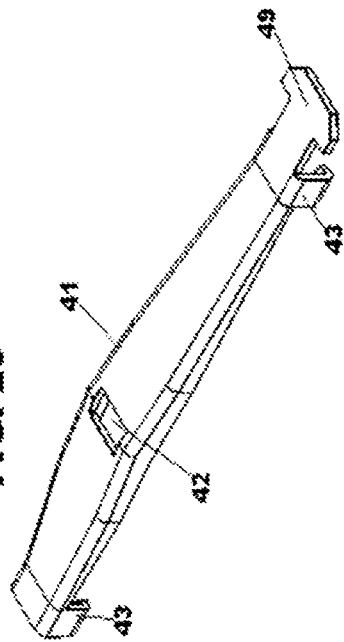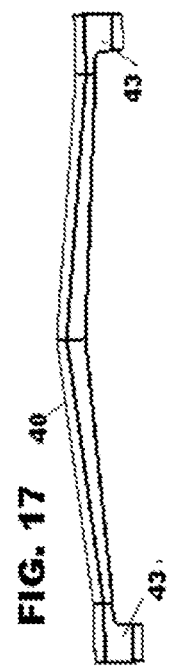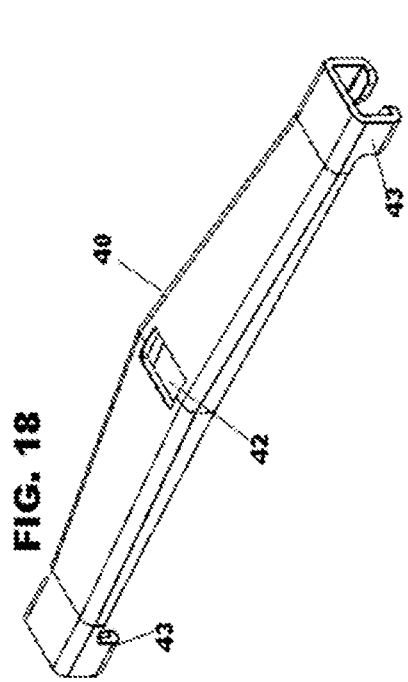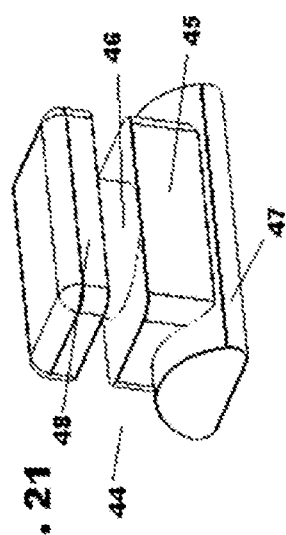

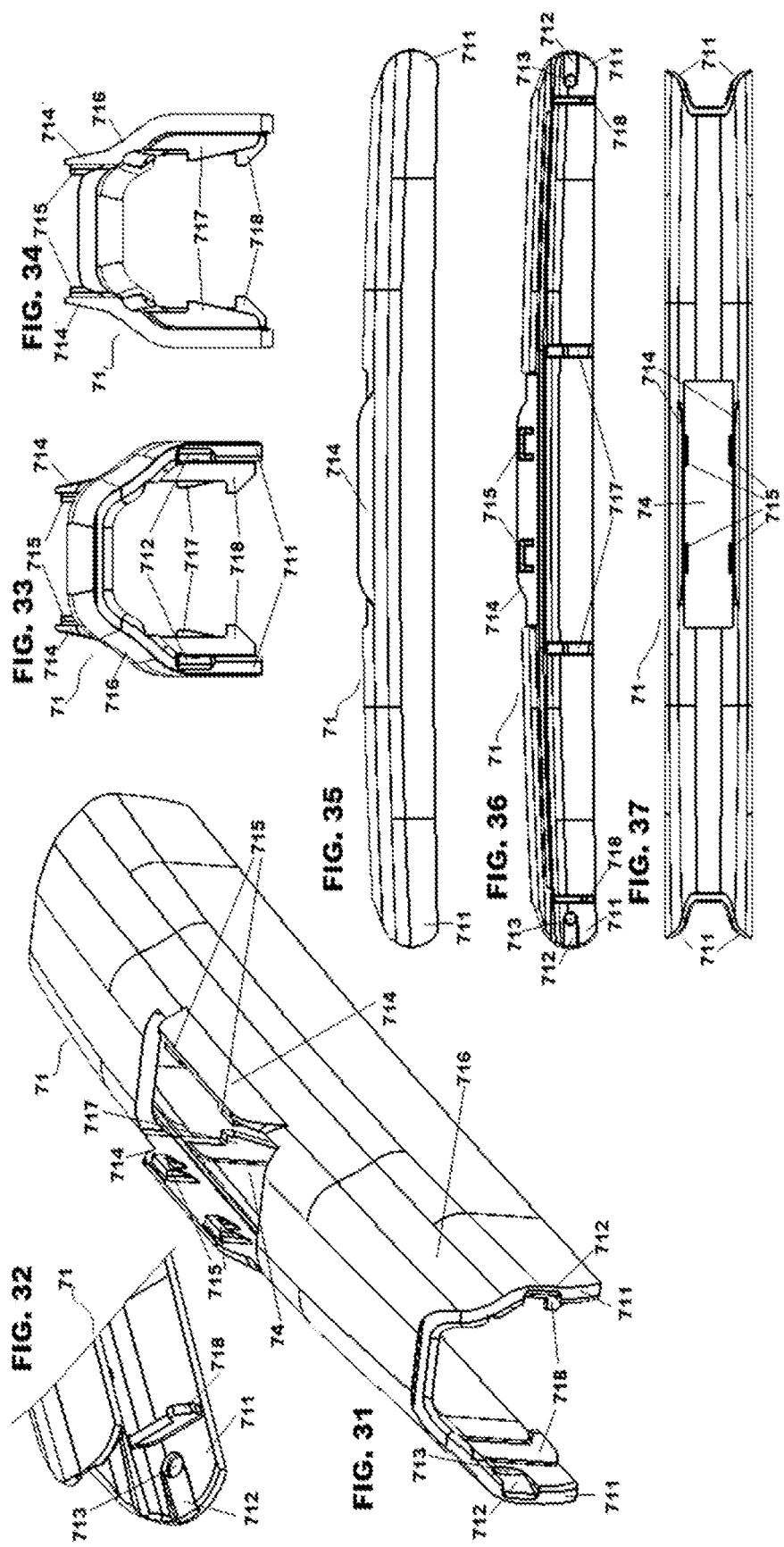

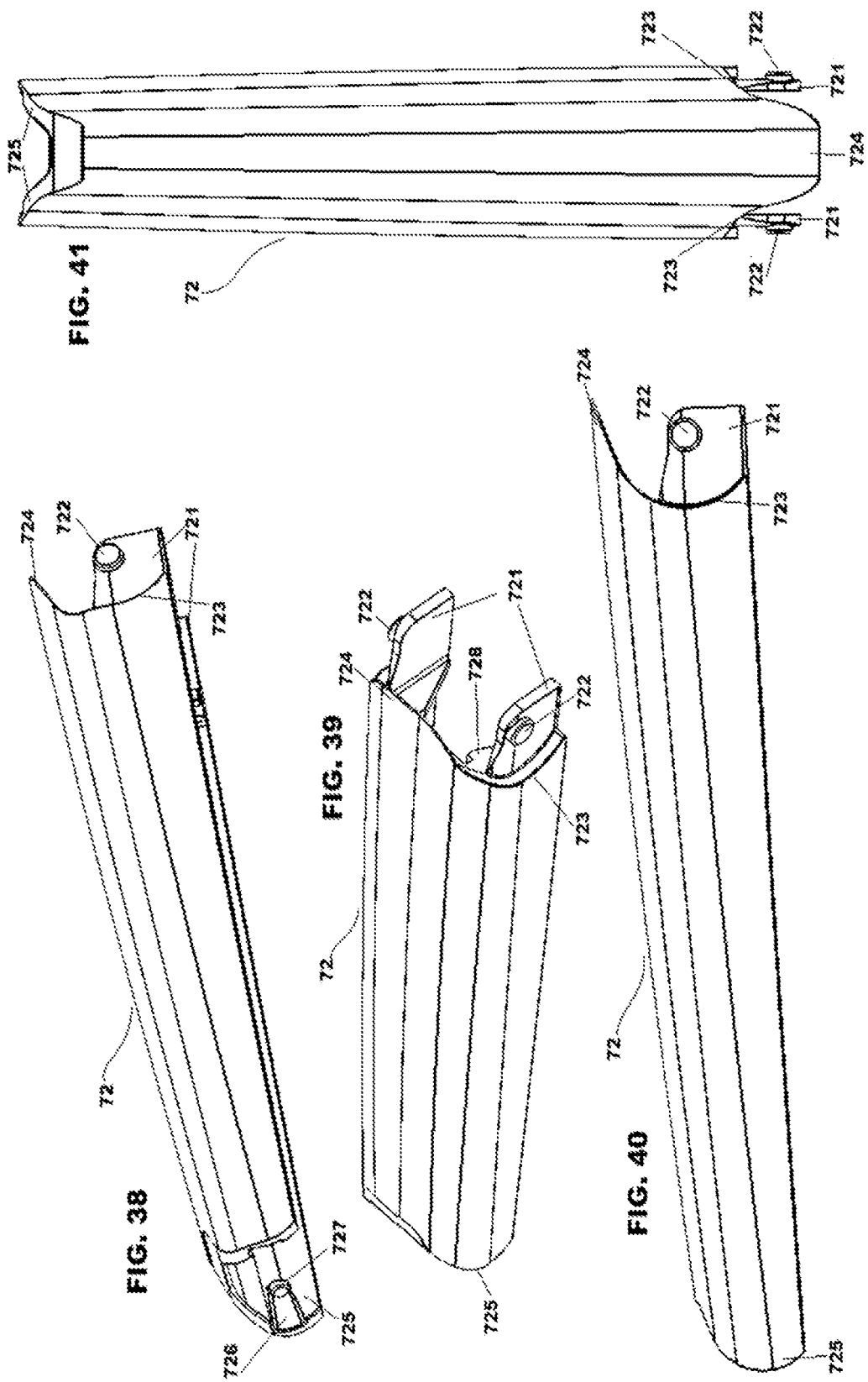

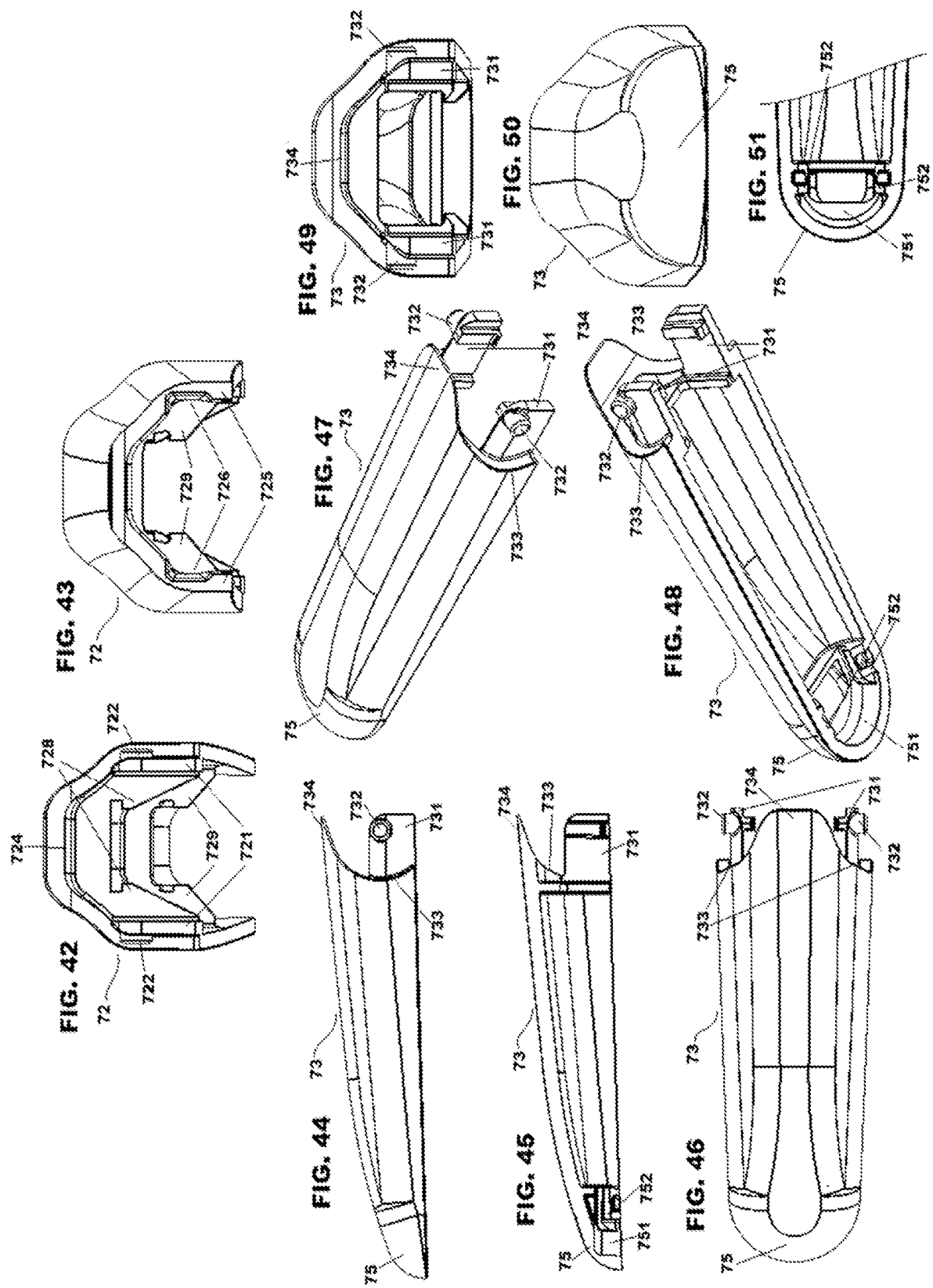

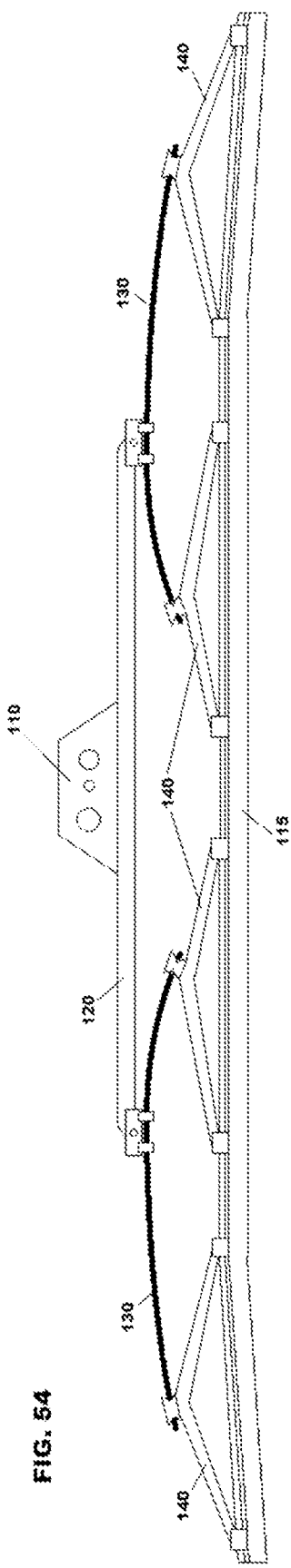

WIPER BLADE

CROSS REFERENCE TO RELATED APPLICATIONS

This application is a continuation of U.S. application Ser. No. 13/776,376 filed on Feb. 25, 2013, which claims the benefit of U.S. Provisional Application No. 61/603,222 filed Feb. 24, 2012, the disclosures of which are hereby incorporated herein by reference in its entirety.

FIELD OF THE INVENTION

This invention relates to the field of windshield wiper blades.

BACKGROUND

Typical wiper blades used on vehicles are plagued with numerous persistent drawbacks. In an effort to improve upon the traditional, bracketed wiper blade, the beam blade (or flat blade) was developed, keeping a lower profile and generally providing a more uniform force distribution than most bracketed wiper blades. However beam blades do not have the lateral stability of bracketed blades, and can have problems with wrapping (i.e. keeping contact between the outer edges of the wiper blade and the windshield) when their curvature is not sufficiently sharp for the windshield, and banding (i.e. losing contact with the windshield in the middle of the wiper blade, thereby leaving an unwiped band) when their curvature is too sharp for the windshield. Accordingly, beam blades may serve well for original equipment (i.e. the wiper blades installed by manufacturers on cars that are designed specifically for that car, but can experience problems on certain vehicles if designed as aftermarket wiper blades (i.e. replacement blades designed to be used on a variety of different windshields where the manufacturer does not know what vehicle the blade will be used on).

The first generation of hybrid wiper blades developed improved on beam blade performance in these circumstances. These blades combine the use of brackets with a beam to improve on the blades' wrapping characteristics without creating problems with banding. The disclosed concept provides an improvement on the first generation hybrid wiper blades, using a combination of traditional brackets and either beams or flat brackets.

The following patent applications are hereby incorporated by reference in their entirety, including their disclosures with respect to the background and field of art of wiper blades: U.S. patent application Ser. Nos. 13/453,601; 13/679,646; 13/572,100 and 13/587,389.

BRIEF SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

In one embodiment, a wiper blade has a wiper strip, a primary frame, and a pair of secondary frames. The primary frame having a connection device capable of connecting the wiper blade to a wiper arm disposed on a top side of the primary frame, and a connection structure disposed, on opposite ends of the primary frame. The pair of secondary frame, each have a central pivot connection portion and two leg portions extending from the central pivot connection portion, a pivot structure disposed on the central pivot connection portion of the secondary frames wherein the pivot structure of the secondary frames are connected to the connection structures on the ends of the primary frame.

In one embodiment a wiper blade has a wiper strip, a force distribution structure having opposing ends, and a cover. The cover comprises a cover center section having two end portions and two cover side sections that are made from a soft, elastic material, wherein the cover side sections cover the end portions of the cover center section and extend to and cover the opposing ends of the wiper blade.

In one embodiment, a wiper blade has a wiper strip, a primary frame and a pair of beams. The primary frame has a top side and opposite ends, a connection device capable of connecting the wiper blade to a wiper arm disposed on the top side of the primary frame, and a connection structure disposed, on each of the opposite ends of the primary frame. The pair of beams each beam have a center portion and two leg portions extending in opposite directions from the center portion; wherein a pivot structure is connected to the center portion of the beams, and connects to the connection structure on the ends of the primary frame.

BRIEF DESCRIPTION OF THE FIGURES

FIG. 1 illustrates a perspective view from above of an embodiment of the disclosed concepts.

FIG. 2 illustrates a perspective view from above of an embodiment of the disclosed concepts without a cover attached.

FIG. 3 illustrates a frontal view of the embodiment of the disclosed concepts depicted in FIG. 2.

FIG. 4 illustrates a perspective view from above of an embodiment of the primary frame.

FIG. 5 illustrates a view of the primary frame of an embodiment of the disclosed concepts along the longitudinal axis of the wiper blade.

FIG. 6 illustrates a side view of a secondary frame of an embodiment of the disclosed concepts, wherein the beam is shown flattened for simplicity.

FIG. 7 illustrates a perspective view from above of a secondary frame of an embodiment of the disclosed concepts, wherein the beam is shown flattened for simplicity.

FIG. 8 illustrates a rivet which may be used in the joint of an embodiment of the disclosed concepts.

FIG. 9 illustrates a perspective view from the side of a turn-buckle holder used in a joint of an embodiment of the disclosed concepts.

FIG. 10 illustrates a view of a turn-buckle holder used in a joint of an embodiment of the disclosed concepts along the axis of the channel.

FIG. 11 shows a bottom view of a turn-buckle holder used in a joint of an embodiment of the disclosed concepts.

FIG. 12 shows a cross-sectional view of a turn-buckle holder used in a joint of an embodiment of the disclosed concepts through the turn-buckle holder's channel.

FIG. 13 illustrates a perspective view from the side of a holder half used in a joint in an embodiment of the disclosed concepts.

FIG. 14 illustrates a view of a holder half used in a joint in an embodiment of the disclosed concepts along the axis of the channel.

FIG. 15 illustrates a view of a holder half used in a joint in an embodiment of the disclosed concepts along the axis of the rivet passage.

FIG. 16 illustrates a bottom view of the holder half used in a joint in an embodiment of the disclosed concepts.

FIG. 17 illustrates a frontal view of a symmetric tertiary bracket of an embodiment of the disclosed concepts.

FIG. 18 illustrates a perspective view from above of a symmetric tertiary bracket of an embodiment of the disclosed concepts.

FIG. 19 illustrates a frontal view of an asymmetric tertiary bracket of an embodiment of the disclosed concepts.

FIG. 20 illustrates a perspective view from above of an asymmetric tertiary bracket of an embodiment of the disclosed concepts.

FIG. 21 illustrates a perspective view of the pivoting stud of an embodiment of the disclosed concepts.

FIG. 31 illustrates a perspective view from above of the center cover segment of a "hard" cover of an embodiment of the disclosed concepts.

FIG. 32 illustrates a perspective view from below of the end section of the center cover segment of a hard cover of an embodiment of the disclosed concepts.

FIG. 33 illustrates a side view of the center cover segment of a hard cover of an embodiment of the disclosed concepts.

FIG. 34 illustrates a cross-sectional view of the middle of a center cover segment of a hard cover of an embodiment of the disclosed concepts.

FIG. 35 illustrates a frontal view of the center cover segment of a hard cover of an embodiment of the disclosed concepts.

FIG. 36 illustrates a cross-sectional view along the middle of the center cover segment of a hard cover of an embodiment of the disclosed concepts.

FIG. 37 illustrates a top view of the center cover segment of a hardcover of an embodiment of the disclosed concepts.

FIG. 38 illustrates a perspective view from the side of a secondary cover segment of a hard cover of an embodiment of the disclosed concepts.

FIG. 39 illustrates a perspective view of a secondary cover segment of a hard cover of an embodiment of the disclosed concepts.

FIG. 40 illustrates a frontal view of a secondary cover segment of a hard cover of an embodiment of the disclosed concepts.

FIG. 41 illustrates a top view of a secondary cover segment of a hard cover of an embodiment of the disclosed concepts.

FIG. 42 illustrates a side view of the inner side of a secondary cover segment of a hard cover of an embodiment of the disclosed concepts.

FIG. 43 illustrates a side view of the outer side of a secondary cover segment of a hard cover of an embodiment of the disclosed concepts.

FIG. 44 illustrates a frontal view of a tertiary cover segment of a hard cover of an embodiment of the disclosed concepts.

FIG. 45 illustrates a cross-sectional view along the middle of a tertiary cover segment of a hard cover of an embodiment of the disclosed concepts.

FIG. 46 illustrates a top view of a tertiary cover segment of a hard cover of an embodiment of the disclosed concepts.

FIG. 47 illustrates a perspective view from above of a tertiary cover segment of a hard cover of an embodiment of the disclosed concepts.

FIG. 48 illustrates a perspective view from below of a tertiary cover segment of a hard cover of an embodiment of the disclosed concepts.

FIG. 49 illustrates a side view of the inner side of a tertiary cover segment of a hard cover of an embodiment of the disclosed concepts.

FIG. 50 illustrates a side view of the end section of a hard cover of an embodiment of the disclosed concepts.

FIG. 51 illustrates a bottom view of the end section of a hard cover of an embodiment of the disclosed concepts.

FIG. 54 illustrates a frontal concept diagram of a novel hybrid wiper blade that is an embodiment of the disclosed concepts.

DETAILED DESCRIPTION

Figure 22:
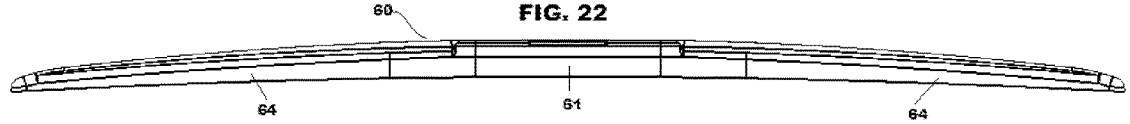
FIG. 22 illustrates a side view of a "soft" cover of an embodiment of the disclosed concepts.

The following detailed description and the appended drawings describe and illustrate exemplary embodiments of the invention solely for the purpose of enabling one of ordinary skill in the relevant art to make and use the invention. As such, the detailed description and illustration of these embodiments are purely exemplary in nature and are in no way intended to limit the scope of the invention, or its protection, in any manner. It should also be understood that the drawings are not to scale and in certain instances details have been omitted, which are not necessary for an understanding of the present invention, such as conventional details of fabrication and assembly.

A novel bracketed and/or hybrid (i.e. having both a spring elastic "beam" and one or more brackets/frames) wiper blade having a cover is presented. Several novel concepts are introduced which can be used both with the disclosed novel wiper blade, or separately with various kinds of traditional, hybrid or beam wiper blades. These novel concepts include, but are not limited to, a novel "soft" cover for any type of wiper blade that is more effective at keeping debris out of the internal structure of the wiper blade than traditional covers; a novel segmented hard cover for any type of wiper blade whose segments connect to each other, and do not require connection to the frame, allowing for a tighter fit line between segments and thus reducing the chance of debris from getting into the mechanism.

In certain embodiments, a wiper blade may include a wiper strip, a primary frame and a pair of secondary frames. The primary frame, may have a top side and opposite ends, a connection device capable of connecting the wiper blade to a wiper arm disposed on the top side of the primary frame, and a connection structure disposed on each of the opposite ends of the primary frame. The pair of secondary frames, may each have a central pivot connection portion, two leg portions extending from the central pivot connection portion, and a pivot structure disposed on the central pivot connection portion of the secondary frames. The pivot structures disposed on the secondary frames may be connected to the connection structures on the ends of the primary frame.

In certain embodiments, the connection structure on the ends of the primary frame may comprise pivot extension walls. In certain embodiments the secondary frame may have a generally thin structure. In certain such embodiments the secondary frame may be a beam. In other such embodiments, the secondary frame may be a bracket. In certain such embodiments, the secondary frame may be provided with a strengthening bead.

In certain embodiments, the pivot structure is a separate structure attached to the secondary frames. In certain embodiments, the legs of the secondary frames may be symmetrical. In other embodiments, one of the two leg portions of a first secondary frame of the pair of secondary frames may be longer than the other leg portion of the first secondary frame of the pair of secondary frames. In certain embodiments at least one leg portion of at least one of the secondary frames is provided with a wiper strip holder capable of securing the wiper strip.

In certain embodiments, the wiper blade may also include at least one tertiary frame, wherein at least one leg portion of at least one of the secondary frames is provided with a tertiary frame connection structure, and wherein the at least one tertiary frame is connected to the tertiary frame connection structure of the least one of the secondary frames.

In certain such embodiments, the wiper blade may also include a cover. In certain such embodiments, the primary frame further comprises a cover-connection structures. In certain such embodiments the cover may be a segmented hard cover, and wherein the cover segments connect to one another via pivot joints, and wherein the cover may be secured to the wiper blades at cover connection structures on the primary frame or secondary frame.

In certain such embodiments the cover may include a cover center section and two cover side sections that are made from a soft, elastic material, wherein the cover side sections cover the ends of the cover center section and extend to the ends of the wiper blade. In certain such embodiments, a central cover portion may be made from a harder material than the two cover side sections.

In certain embodiments, a wiper blade comprising: a wiper strip, a force distribution structure having opposite ends, and a cover. The cover may include a cover center section having two end portions and two cover side sections that are made from a soft, elastic material, wherein the cover side sections cover the end portions of the cover center section and extend to and cover the opposing ends of the wiper blade.

In certain embodiments, a wiper blade may include a wiper strip, a primary frame and a pair of beams. The primary frame may have a top side and opposite ends, a connection device capable of connecting the wiper blade to a wiper arm disposed on the top side of the primary frame, and a connection structure disposed, on each of the opposite ends of the primary frame. The pair of beams, may each having a center portion and two leg portions extending in opposite directions from the center portion. The pivot structure may be connected to the center portion of the beams, and may connect to the connection structure on the ends of the primary frame.

In certain such embodiments the wiper blade may also include at least one tertiary frame, wherein at least one of the beams further comprises at least one tertiary frame connection structure and the at least one tertiary frame is connected to the at least one tertiary frame connection structure. In certain such embodiments, each of the leg portions of at least one of the beams may have a different curvature.

As can be seen in FIGS. 2-4 the main support structure of the wiper blade preferably includes a primary frame 20 having a connection device 10 on its top side to which a connector and/or or adapter (not shown) can be used to connect the wiper blade to a wiper arm. Suitable connectors which allow the wiper blade to be connected to various different types of wiper arms are known in the art, and include U.S. Pat. No. 6,640,380 and U.S. patent application Ser. Nos. 13/558,624, and 13/560,585, each of which is incorporated by reference herein in its entirety. Alternatively, the connection device 10 can be implemented to connect directly to a particular kind of wiper arm with or without the use of a connector and/or adapter. The connection device 10 may attach to the primary frame 20 through the use of welding, screws, rivets, claws, crimping or any other method known in the art. Alternatively, the connection device 10 may be an integrated part of the structure of the primary frame 20. The connection device 10 may be made out of metal, plastic or any other suitable material known in the art or any combination of suitable materials known in the art.

The primary frame 20 may be made out of metal, plastic or any other suitable material known in the art, or any combination of suitable materials known in the art. The primary frame 20 may be straight or predominantly straight in shape when viewed from the front (as shown in FIG. 2-4), or may bear a more pronounced curvature. A connection to a pivot structure may be located at each end of the primary frame 20, and allows the primary frame 20 to connect to a secondary frame 30, in such a manner as to allow the secondary frame 30 to pivot about a pivot axis. A novel pivot structure which is the subject of U.S. Provisional Application 61/603,223 and the nonprovisional application filed concurrently herewith is described below, but any pivot structure known in the art may be used in connection with the described wiper blade.

As shown in FIG. 5, the profile of the primary frame 20 below the connection device 10, when viewed along the longitudinal axis of the wiper blade, is preferably U shaped to add strength and rigidity to the primary frame. The primary frame may have a horizontal wall 21 from which two side walls 22 may descend vertically. The distance between the side walls 22 may be constant along the length of the primary frame 20, or it may taper or expand as it approaches either end of the primary frame 20. As described above, at either end of the primary frame is a connection to a pivot structure. One such connection is shown in FIGS. 2-5, as pivot extension walls 23. These pivot extension walls 23 extend from the side walls 22 of the primary frame 20 and facilitate the connection of the primary frame 20 to the pivot structure. The pivot extension walls may be provided with holes 24 which will form part of the pivot structure, wherein a rivet, or protrusions may be placed to facilitate the pivoting of the secondary frame 30. Persons of skill in the art will recognize that various alternative pivot structures, and connections to pivot structures might be used and remain within the scope of the disclosed concepts, including without limitation providing the pivot extension walls with protrusions instead of holes, or a rivet onto which other parts of the pivot structure can attach by in any known manner. The horizontal wall 21 may end before, or part way along, the pivot extension walls 23 in order to give the pivot structure a wider range of motion, or may optionally extend all the way to the end of, or past, the pivot extension walls 23.

Figure 52:
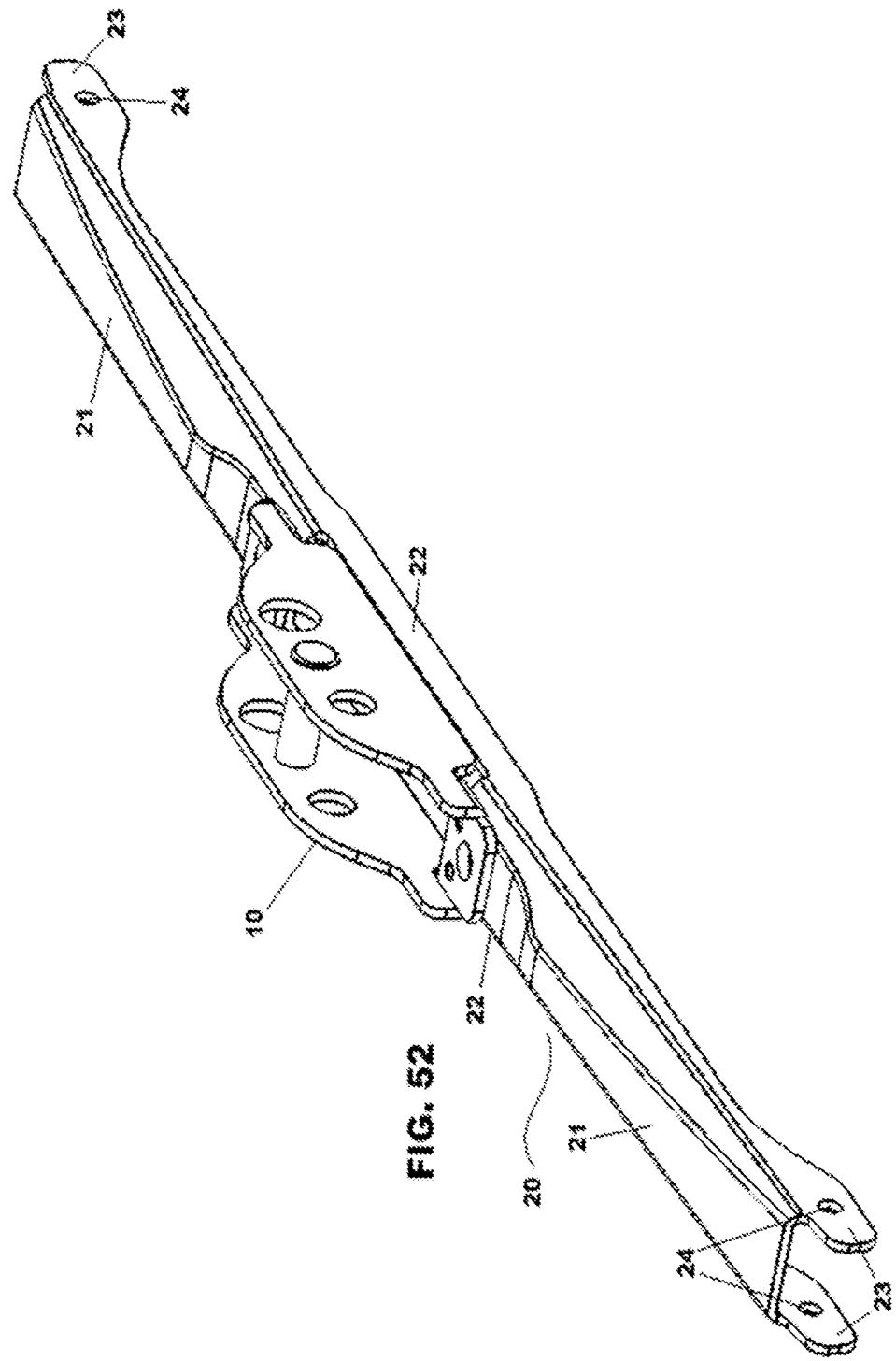
FIG. 52 illustrates a perspective view from above an alternative embodiment of the primary frame of an embodiment of the disclosed concepts.
Figure 53:
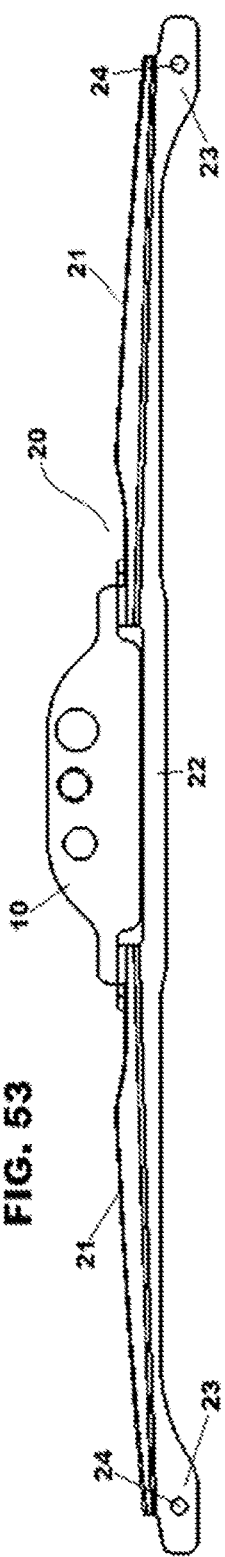
FIG. 53 illustrates a frontal view of the primary frame depicted in FIG. 52.

FIGS. 52 and 53 show another embodiment of the primary frame 20 wherein the horizontal wall 21 running along the top of the primary frame 20 is angled such that from an area near the connection device 10 the surface of the horizontal wall 21 decreases in height it approaches the pivot extension walls 23. The walls joining the horizontal wall 21 to the side walls 22 in this embodiment is also sloped (and in some embodiments, may be fluted), and the width of the horizontal wall 21 is narrower nearer to the connection device 10 than on the ends of the primary frame 20. This allows a cover 60, 70 to have a greater degree of fluting and a narrower top, which can give it an aerodynamic effect similar to spoiler, which can improve the wiper blade's wind-lift performance.

As discussed in greater detail below, the primary frame 20 and/or the connection device 10 may also have cover-connection structures, such as projections, recesses, extension walls with holes, recesses, projections or rivets, etc., to facilitate the connection of the cover 60, 70, or portions thereof, to the primary frame 20.

The secondary frame 30 is preferably made out of metal, such as steel, and can optionally be spring-elastic. The secondary frame 30 can also be made from plastic, or any other suitable material known in the art. In certain embodiments (not shown in the figures), the secondary frame 30 can be a curved, spring-elastic beam, making the such embodiments "hybrid" wiper blades, as they are a hybrid combining elements of a bracketed (or framed) wiper blade and a beam (or frameless) wiper blade. The secondary frame 30 preferably has a central pivot connection portion 31, which connects the secondary frame 30 to the primary frame 20 via a pivot structure. The central pivot connection portion 31 is preferably flattened (as shown in FIGS. 6 and 7), but may be curved. The central pivot connection portion 31 may have connecting structures, such as recesses 32; projections; or pivot joint wings having either (1) a rivet or projections to attach to corresponding recesses, holes or clips in the primary frame's 20 pivot extension walls 23 or other connection to a pivot structure; or (2) recesses to receive corresponding projections, rivets, etc. in the primary frame's 20 pivot extension walls 23 or other connection to a pivot structure. Persons of skill in the art will recognize that numerous types of pivot structures can be used, whether directly connecting the secondary frame 30 to the primary frame 20, or as described below in the novel pivot joint presented, using an intermediary piece (or pieces) to join the two.

On either side of the central pivot connection portion 31, the secondary frame 30 has legs 33, 34. The legs 33, 34 of the secondary frame 30 may be symmetric or asymmetric (as shown). The legs 33, 34 of the secondary frame 30 may be of the same, or different in lengths. In some embodiments, it may be advantageous to have the outer leg 33 (the leg further from the middle of the wiper blade) with a longer length than the inner leg 34 to allow a more compact primary frame 20, while still allowing the wiper blade to wrap around the curvature of the windshield along its extremities, and improve wipe quality. Similarly, each leg 33, 34 may be independently straight, curved, or have a more elaborate structure depending on the vehicle(s) for which they are designed. In some embodiments having curved legs 33,34 it may be advantageous to have the curvature of the inner leg 34 (i.e. the leg closer to the center of the wiper blade) be different than the curvature of the outer leg 33. In some embodiments, it can be particularly advantageous to provide the inner leg 34 with a sharper curvature than the curvature of the outer leg 33 in order to provide better wrapping of the wiper blade around the curvature of a windshield, and thus improving wipe quality. Similarly, in embodiments with straight legs 33, 34 it may be advantageous to provide the outer leg 33 with a smaller angle of descent from the central pivot connection portion $\theta$ than the angle of descent $\varphi$ of the inner leg 34.

As shown in FIGS. 6 and 7, the secondary frame 30 may be a generally thin bracket, and may optionally be provided with a strengthening and stiffening bead 35, giving it a more robust form, and increasing its lateral rigidity. The strengthening bead 35 may be provided along either, or both legs 33, 34, and may also extend onto portions of the central pivot connection portion 31.

As discussed above, persons of skill in the art will recognize that the pivoting structure joining the primary frame 20 and the secondary frame 30 may be made in many different ways known in the art, either by directly connecting the two frames directly, or by using intermediary structures to do so. One such method for connecting the primary frame 20 to the secondary frame 30, described in greater detail in U.S. Provisional Patent Application No. 61/603,223, and in the concurrently filed non-provisional application entitled Hinged Wiper Blade filed concurrently herewith uses a turn-buckle holder 51 made up of two holder halves 52 held together by a rivet 50. Thus, when assembled, one holder half 52 is attached to the secondary frame 30 opposite the other holder half 52 at the central pivot connection portion 31 wherein the central pivot connection portion 31 is inserted into the channel 54 formed between the upper channel wall 56 and lower channel wall 57 of each holder half 52. The holder halves 52 are then pushed together such that the holder half's 52 projections 55 engage the recesses 32 on the central pivot connection portion 31 of the secondary frame 30. Alternatively, in embodiments where the central pivot connection portion 31 has projections, the holder halves 52 can be implemented so as to have recesses to receive such projections.

Once the holder 52 halves have been pushed together such that the turn-buckle holder 51 contains the secondary frame 30 within its channel 54, the turn-buckle holder 51 can be placed between the pivot extension walls 23 of the primary frame 20, and a rivet 50 (shown in FIG. 8) can be passed through the holes 24 in the pivot extension walls 23 and through the rivet passage 53 in the turn-buckle holder 51 and secured on the opposite side. Persons of skill in the art will recognize that various modifications of such a structure can be made while remaining within the scope of the disclosed concepts, including without limitation, providing protrusions on the pivot extension walls 23 which can engage the rivet passage 53 in the holder, or providing the holder 51 with protrusions that can engage the holes 24 in the pivot extension walls 23. FIGS. 9-12 show various views of the holder 51. FIG. 12, in particular, shows a cross-section of the turn-buckle holder 51 taken through the channel 54 along its plane. As can be seen in FIG. 12, the projections inside the holder halves 52 (and thus also the corresponding recesses 32 in the secondary frame 30) can be made of varying sizes, and need not be symmetric with the projections 55 in the opposite holder half 52. In certain embodiments, such as that depicted in FIG. 12, two different sizes of projections 55 may be used in the holder halves 52 in order to facilitate proper alignment of the secondary frame 30 with the turn-buckle holder 51 during assembly. In an alternative embodiment, the turn-buckle holder 51 is a unitary structure. Such a structure can be made through insert molding, where the unitary turn-buckle holder is molded around the secondary frame. This provides a tighter grip by the turn-buckle holder on the secondary frame.

FIGS. 13-16 show various views of a holder half 52. As can best be seen in FIGS. 13 and 15, the lower channel wall 57 may be angled, or curved in order to allow pivoting of the secondary frame 30 within the turn-buckle holder 51, or to facilitate the attachment of the turn-buckle holder to the secondary frame 30 by providing a wider entry point on the edges of the channel 54 in the holder half 52 while still providing a snug-fitting attachment in the middle portion of the holder half 52. Alternatively, both the top channel wall 56 and the lower channel wall 57 may be shaped to follow the contour of the central pivot connection portion 31 of the secondary frame 30 or to facilitate insertion of the secondary frame 30 into the holder halves 52. This novel pivot-hinge connection between the primary and secondary frames can be accomplished within the limited height of the pivot extension walls 23 of the primary frame 20, and thus allows the disclosed wiper blade to maintain a relatively low profile, thereby reducing the effect of wind-lift on the wiper blade at high speeds and reducing or obviating the need for a spoiler on the wiper blade.

The ends of the secondary frame 30 may either be provided with a wiper strip holder, such as the claws 43 on the tertiary frames 40, 41, or may with a connection extension 36 having a structure to connect to a tertiary frame 40, 41. In certain embodiments, as shown in FIGS. 6-7 and 17-21 the connection between the secondary frame 30 and the tertiary frame(s) 41, 42 is formed by passing a pivoting stud 44 through a hole 42 in the central joint connection portion of the tertiary frame and a hole 37 in the connection extensions 36 on the secondary frame 30. As shown in FIG. 21, the pivoting stud 44 has a tertiary base portion 45 sized to fit in the hole 42 of the tertiary frame 40, 41, and a bottom portion 47 that is wider than the hole 42 in the tertiary frame 40, 41. Thus tertiary frame 40, 41, is supported on the bottom portion 47 of the pivoting stud 44 when the wiper blade is assembled. Accordingly the base portion 47 may be curved (as shown in FIG. 21) or angled in order to facilitate the pivoting of the tertiary frame 40, 41. The pivoting stud 44 is also provided with a top portion 48 and a neck 46 wherein the diameter of the neck is approximately the same as the width of top portion 48 and smaller than the length of the top portion. Both are the top portion and the neck are sized to fit into the hole 37 of the secondary frame, and the height of the neck is approximately the same as the thickness of the connection extension 36 of the secondary frame 30. During assembly, the pivoting stud's 44 top portion 48 and neck 46 are inserted into hole 37 in the connection extension 36 of the secondary frame 30, and then turned such that the top portion 48 is perpendicular to the long side of the hole 37 in the connection extension 36. Accordingly a high friction material, such as natural or synthetic rubber is preferred for the pivoting stud 44, but plastic and/or other suitable materials may also be used. Persons of skill in the art will recognize that alternative forms of connecting the tertiary frames to the secondary frames may be used within the scope of the disclosed concepts, and that any of the forms for creating a pivoting structure/joint between the primary and secondary frames discussed above could be implemented between the secondary and tertiary frames, and vice versa.

The tertiary frames 40, 41 may be symmetrical tertiary frames 40 or asymmetrical tertiary frames 41. In certain embodiments, as shown in FIGS. 2-3, it may be advantageous to use symmetrical tertiary frames 40 on the connection extensions 36 nearer to the middle of the wiper blade, and asymmetric tertiary frames 41 on the connection extensions 36 nearer to the extremities of the wiper blade. In such embodiments it may be advantageous to put the longer leg of the asymmetric tertiary frames 41 extending outward from the wiper blade so as to provide a better wrap around the surface of a curved windshield of a vehicle.

Whether symmetric or asymmetric, the tertiary frames are provided with claws 43 which support the wiper strip 15. The wiper blade described herein can use any of the traditional wiper strips known in the art, which generally have a base portion having grooves into which metal vertebrae are inserted to provide lateral support for the wiper strip 15. Alternatively, the wiper blade described above can be implemented using the wiper strip carrier described in U.S. patent application Ser. No. 13/558,624, which is incorporated herein by reference in its entirety, and is attached hereto.

As shown in FIGS. 19 and 20, the tertiary strip may have a structure to support and/or secure the cover 60, 70. The support structure shown in FIGS. 19 and 20 is a chamfered "T" shaped structure 49 which the end of the cover can grip onto and support itself. Such a support structure can be put on either an asymmetric tertiary frame 41, as shown, or on a symmetric tertiary frame 40. Any other types of supporting structures for the cover 60, 70 described above with regard to the primary frame, or otherwise known in the art, including rivets, projections, recesses, wing walls having same, etc. can be used on the tertiary frames 40, 41. Similar such supporting structures can also optionally be included in the secondary frame 30 as well.

The novel "soft" cover 60 introduced in this provisional patent application can be used with any known type of wiper blade, including the above-described wiper blade, beam blades, The wiper blade covers on commercial wiper blades (whether with or without spoilers) generally have a hard plastic cap (see U.S. Pat. Nos. 7,293,321 and 7,523,520) hovering over the connection device (See U.S. Pat. No. 6,944,905). Particularly in beam blades, the hard plastic cap above the cover must leave a gap between the top surface of the cover and the bottom surface of the cap. Failure to leave such a gap results in the cap pushing down on the cover during the operation of the wiper blade, which compresses the material of the cover, and exerts a force onto the beam or other support structure, which can have adverse effects on the wipe quality of the wiper blade. Similarly, designing a connection device to form a contact seal with a cover can really only be done by custom-tailoring the wiper blade to a particular curvature of a particular windshield. Thus for aftermarket wiper blades, where the manufacturer does not know what windshield its products will be used on, the required specific calculations cannot be made across multiple windshields, and thus the same problem of cover-material compression and adverse forces on the beam/support structure may be present on some windshields but not others. Accordingly most wiper blade manufacturers (particularly after-market manufacturers) provide wiper blades with a gap between the cover and the cap or other structure that covers it. The novel "soft" cover 60 presented in this application solves these problems by reversing the order of the pieces. This allows the relatively softer material on the cover side sections 64 stretch when necessary as the wiper moves over the windshield, which lessens or eliminates the adverse forces put upon the beam, vertebrae and/or support structure of the wiper blade. At the same time the relatively harder material of the cover center section 61 helps secure the connection with the cover side sections 64. Persons of skill in the art will recognize that it is not necessary for the cover center section 61 to be made from a harder material than the cover side sections 64. Indeed they can be made from the same material. Suitable materials for both the cover center section 61 and the cover side sections 64 include natural and synthetic rubber, plastic, and other materials known in the art. However, in some embodiments it has been found advantageous to use a plastic material with a Shore hardness A values above 90 in the cover center section 61, and plastic, natural rubber, or synthetic rubber material with Shore hardness A values between 60 and 90 in the cover side sections 64. Improved results have been found using a material of Shore hardness A between 80 and 88 in the cover side sections 64, as it is still flexible enough not to affect the beam/support structure, but hard enough to maintain good grips on the cover center section 61 as well as on the wiper blade's primary frame 20, secondary frame 30, tertiary frame 40, 41 and/or a beam (in the case of beam blades and/or hybrid blades).

Accordingly a cover center ("hard") section 61 is provided with side connecting structures 62, and top recesses/holes 63 which receive corresponding side receiving structures 65 and top projections 66 from the cover side sections 64. The cover center section 61 is preferably, but not necessarily, made from a harder material than the cover side sections 64.

Figure 23:
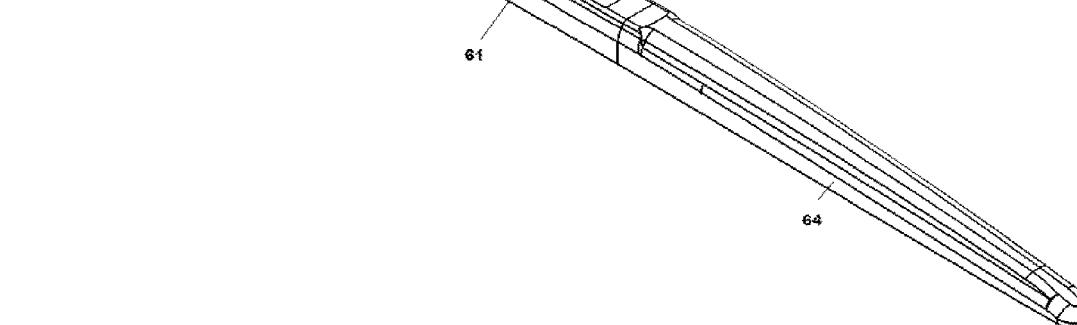
FIG. 23 illustrates a perspective view from above of a "soft" cover of an embodiment of the disclosed concepts.
Figure 24:
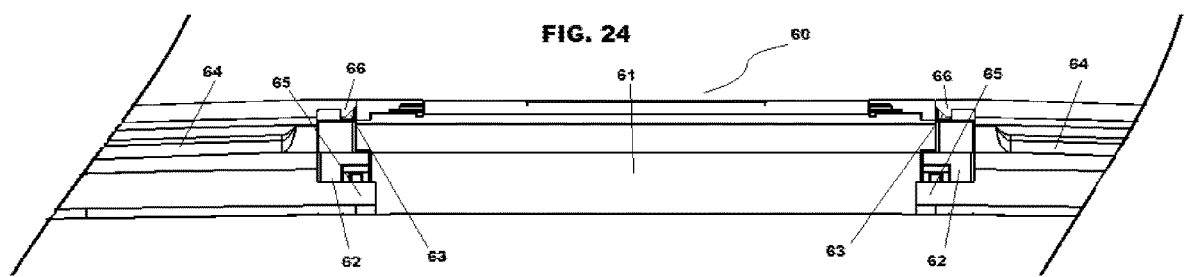
FIG. 24 illustrates cross sectional view of the inside of the "soft cover" of an embodiment of the disclosed concepts.

FIGS. 22-24 show the novel "soft" cover with the cover center section 61 and the cover side sections 64 connected. FIG. 24, which has a cross-sectional view, shows the mechanics of the connections between the sections of the cover 60, showing the top projections 66 on the cover side sections 64 engaging the top recesses/holes 63 in the cover center section 61.

Figure 25:
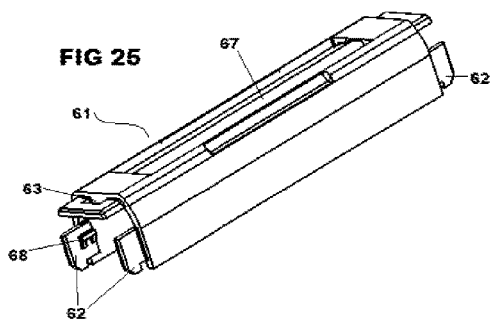
FIG. 25 illustrates a perspective view from above of the cover center section of the "soft" section of an embodiment of the disclosed concepts.
Figure 26:
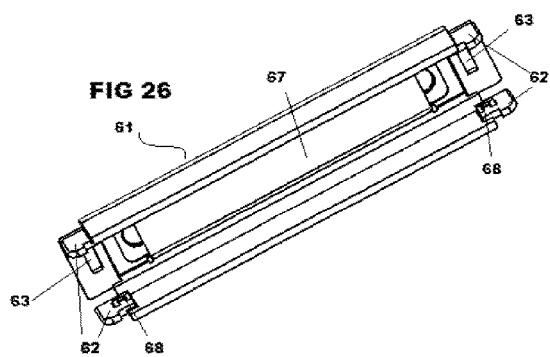
FIG. 26 illustrates a perspective view from below of the cover center section of the "soft" cover of an embodiment of the disclosed concepts.

As shown in FIGS. 25-26, the top holes 63 in the cover center section 61 may be located on a recessed ledge such that when the cover side sections 64 are attached, a smooth, continuous surface is present on the combined structure (see FIG. 22-24). The side connecting structures 62 on the cover center section 61 may project outwardly from the main body of the of the cover center section 61, and may optionally include bottom projections (shown in FIGS. 24-26) which grip a corresponding recess or hole in the cover side sections' 64 side receiving structures 65. These side connecting structures 62 may further be laterally recessed in order to provide a smooth transition of the outer surfaces of the cover center section and the cover side sections 64 on the sides as well. Moreover, the recessed ledge housing the top hole 63 and the recessed side connecting structures 62 may be joined such that the cover side section lip which covers these structures forms a seal along the boundary of these structures to prevent any water or debris from entering therein. The cover center section may have a hole for the connection device to pass through, and may have internal grips 68 which grip may be used to grip the primary frame 20, connection device 10, and/or beam (in the case of beam or hybrid wiper blades).

Figure 27:
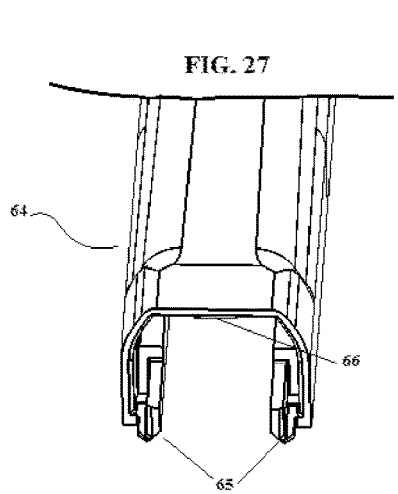
FIG. 27 illustrates a perspective view from above of the end portion of the cover side sections of the "soft" cover of an embodiment of the disclosed concepts.
Figure 28:
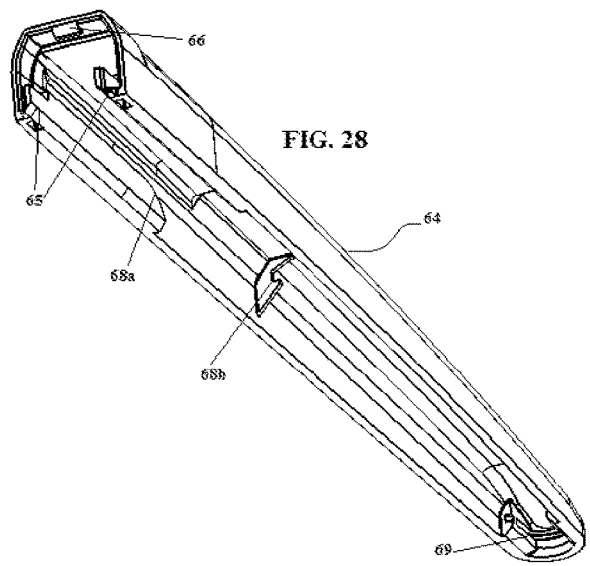
FIG. 28 illustrates a perspective view from below of a cover side sections of the "soft" cover of an embodiment of the disclosed concepts.
Figure 29:
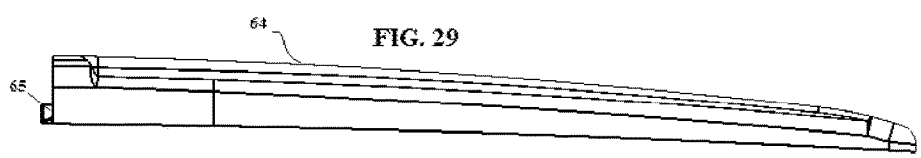
FIG. 29 illustrates a frontal view of a cover side section of the "soft" cover of an embodiment of the disclosed concepts.

FIGS. 27 and 28 show the corresponding structures on the cover side sections 64 that connect it to the cover center section 61. The side receiving structures 65 on the cover side sections 64 receive the side connecting structures 62 from the cover center section 61. As shown in FIG. 28, these side receiving structures 65 may have a recess or hole in them to receive the optional bottom projection of the side connecting structures 62. For added ease of making the connection, and to ensure a better connection, as shown in FIGS. 24 & 29, the side receiving structures 65 can project outwardly from the cover side section 64. This increases the surface area of the side connections, and provides a guiding path for the insertion of the side connecting structures 62 into the side receiving structures 65. The top projection 66 may be located on a lip of the which may be elevated, or have a smaller thickness than the main walls of the cover side section in order to facilitate the smooth transition in the outer surface of the joined cover center section 61 and cover side sections 64. This lip may also help form a seal to keep water and debris out of the internal structure of the wiper blade. Accordingly, the top projection 66 and side receiving structures 65 together with the top hole 63 and side connecting structures form a three sided locking mechanism which ensures better protection against the elements without interfering with the operation of the underlying support structure, whether it is brackets or beams.

FIG. 28 also shows several different kinds of internal grip structures. The contoured grip 68a extends back from the side receiving structures 65, gripping and following the contour of the bottom of the primary frame 20, including sloping downwards towards the end of the grip structure to follow the contour of the pivot extension walls 23. The rib grip 68b acts both as a structural supporting rib, and as a loose grip on the secondary frame 30, and has a recess cut into it to accommodate a bead 35 on the secondary frame 30. This loose grip allows the secondary frame to move upwards and downwards during operation of the wiper blade within a set range without interfering with the movement of the secondary frame 30. The loose internal grip can also be used on the "quarter" portion of beam/hybrid blades—half way between the center and the end of the beam—to give that part of the beam room to bend without interfering with its behavior. Intermittent or continuous claw-like grips (not shown) can also be used, particularly on beam blades and/or hybrid blades where the cover must be secured to the beam. One possible internal end grip 69 is also shown in FIG. 28. This grip has a slotted pocket in the end portion of the cover which receives the chamfered "T" structure on the tertiary frame 41 of the above-described wiper blade. Other types of end grips may be used, including detents, dovetails, projections, and all such end grips described in U.S. patent application Ser. Nos. 13/453,601, 13/572,100 and 13/587,389, which are incorporated herein by reference in their entirety.

Figure 30:
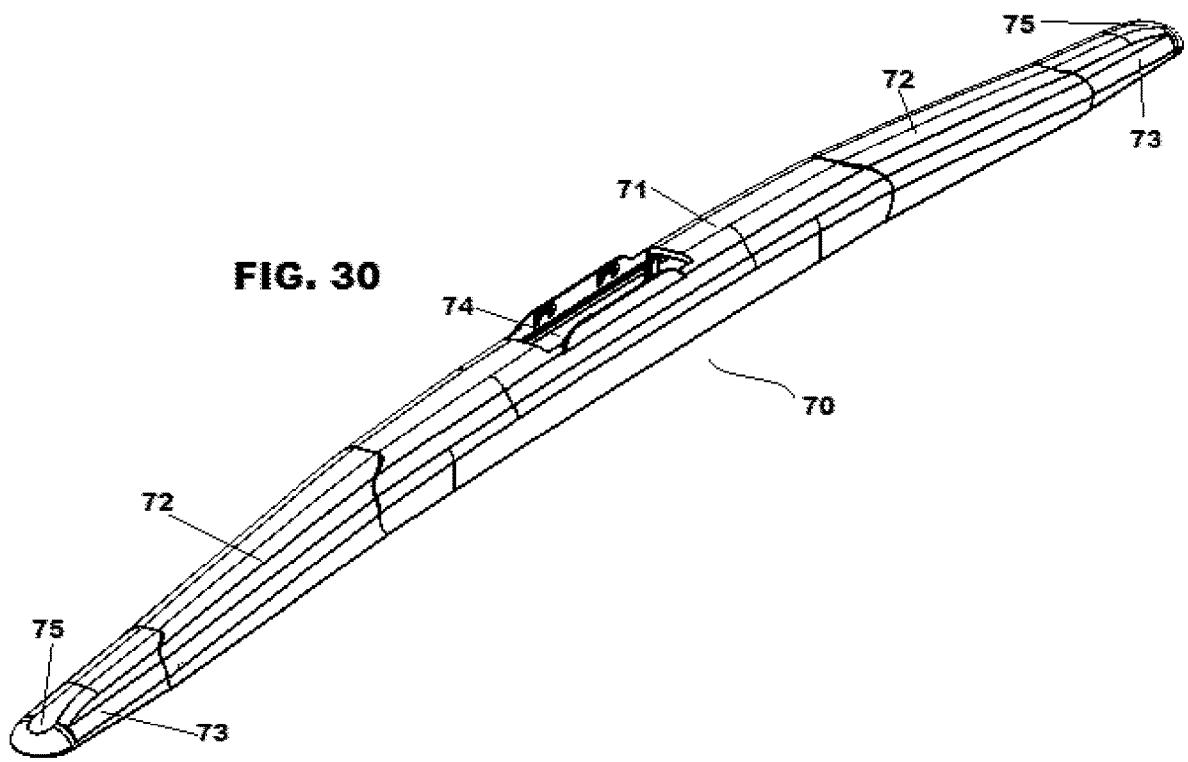
FIG. 30 illustrates a perspective view from above of a "hard" cover of an embodiment of the disclosed concepts.

A second type of novel cover—a "hard" cover 70 is presented in FIGS. 30-52. As shown in FIG. 30, the cover 70 may be composed of multiple segments. A center cover segment 71 has an opening 74 through which the connection device 10 can be passed. Secondary cover segments 72 can be attached to each side of the central cover segment 71. Optional, tertiary cover segments 73 can be attached to the outer ends of the secondary cover segments 72. Additional cover segments can also be used on covers of this type. The outermost end of the outermost segment has an end section 75. The segments of the "hard" cover are preferably made of a plastic, and need not actually be "hard". It can be advantageous to use a plastic having a Shore hardness A of greater than 90. However, any suitable material known in the art can be used to make the cover 70, including materials having a Shore hardness A values of 90 or less.

FIGS. 31-37 illustrate various views of the center cover segment 71 of the cover 70. The end sections of the center cover segment 71 has receiving walls 711, which are used to connect to the secondary cover segments 72 using a pivoting connection. The receiving walls 711 may have a receiving channel 712 and a seating recess 713 which receives a projection 722 from the secondary cover segments 72. The a seating hole may also be used in place of a seating recess 713. In some embodiments it may be advantageous for the receiving walls to be narrower than the main walls of the center cover segment 71, or to have the receiving walls 711 taper so as to allow them to deflect enough to allow the insertion of the projections 722 of the secondary cover segment 72. Persons of skill in the art will recognize that the projection may be located on the center cover segment 71, and that the seating recess may be located on the secondary cover segment 72. Likewise other pivoting connections known in the art, including the use of rivets, or additional structures known in the art which allow the center cover segment and the secondary cover segment to form a pivoting connection may also be used.

The center cover segment 71 may also have a lip 714 which can cover the sides of the connection device, and hold grips 715 and/or other structures which can help secure the center cover segment 71 to the primary frame 20. Additional internal grips 717, 718 can be located along the inner surface of the center cover section 71 and may also help secure the center cover section to the primary frame 20. As can be seen in FIGS. 33 and 34, the internal grips 717, 718 may be implemented as appropriate to fit a particular design of primary frame 20. For instance the inner internal grips 717 are sized to secure the shorter middle portion of the side walls 22 of the primary frame 20, while the outer internal grips 718 are sized to secure the larger pivot extension walls 23 of the primary frame 20.

As shown in FIGS. 30, 31, 33 and 34, the cover 70 may be provided with fluting 716 on its outer walls. The fluting may act as an aerofoil to help increase the downward force on the wiper blade at higher speeds. Alternatively the cover may be shaped to embody a spoiler, with or without fluting. Such spoilers can be embodied as a symmetric isosceles triangle (with or without fluting), as an asymmetric right triangle (with or without fluting), or in any other suitable shape. Similarly, embodiments of the cover 70 that do not have a spoiler may also be symmetric, as shown in FIGS. 30-51, or asymmetric.

FIGS. 38-43 illustrate various views of the secondary cover segments 72 of the cover 70. The inner side of the secondary cover segment includes a connecting wall 721 which contains a projections 722 which pass through the receiving channel 712 and into the seating recess 713 of the receiving wall 711 of the center cover segment 71. The connecting wall 721 may be narrowed, or may taper in order to bend to allow the insertion of the projection 722 into the seating recess 713. As best shown in FIGS. 39 and 41, the connecting wall 721 is preferably laterally recessed, such that the receiving wall 711 of the center cover segment 71 can cover it. The outer edge 723 of the inner side of the secondary cover segment 72 and the edge of the receiving wall 711 may have complementary shapes which allow the secondary cover segment 72 and the center cover segment 71 to form a pivot joint that can move during the operation of the windshield wiper as the curvature of the windshield underneath the wiper strip 15 changes. The outer edge 723 of the inner side of the secondary cover segment 72 may also define a covering portion 724 which covers a portion of the outer edge of the center cover segment 71, and can help prevent water, ice or debris from entering the internal structure of the wiper blade. Persons of skill in the art will recognize that a covering portion can instead be located on the receiving walls of the center cover segment, and can cover corresponding portions of the inner side of the secondary cover segment. Persons of skill in the art will also recognize that a covering wall (not shown) can be used to join the portions of the edge of the segment that is covered by the covering portion 724, in order to increase the protection against debris, water and ice at the joint between the center cover segment and the secondary cover segment.

The secondary cover segment may have an end section 75, or it may have a second receiving wall 725 with a second receiving channel 726 and a second seating recess 727 which connect the secondary cover segment 72 to a tertiary cover segment 73. Persons of skill in the art will recognize that it is not necessary for the cover 70 to be symmetric, or to have the same number of segments on each side of the center cover segment 71. As discussed above, persons of skill in the art will also recognize that the projections and recesses connecting the cover segments may be reversed, and that other pivoting structures such as rivets may be used to make the pivoting connection between the cover segments.

As illustrated in FIGS. 42 and 43, the secondary cover segment 72 may also have internal grips 728, 729 which can grip the portion of the frame that the secondary cover segment 72 covers. The internal grips 728, 729 depicted are sized to secure the secondary frame 30 of the wiper blade. The internal grips may be sized to form a tight grip on the corresponding portion of the frame, or may be sized larger than the frame in order to give the frame a defined freedom of movement within the grip to allow for greater variability in its positioning during the operation of the wiper blades, as the curvature of the windshield under the wiper changes.

An embodiment of a tertiary cover segment is illustrated in FIGS. 33-50. The depicted tertiary cover segment 73 has a second connecting wall 731 having a second projection 732 which engages the second seating recess 727 on the second receiving wall 725 of the secondary cover segment 72. The tertiary cover segment 73 may have an outer edge 733 which is shaped complementary to the second receiving wall 725 of the secondary cover segment 72 so as to allow the joint between the secondary cover segment 72 and the tertiary cover segment 71 to pivot and move during the operation of the wiper blade. The tertiary cover segment 73 may have a second covering portion 734 which covers the corresponding portion of the receiving wall 725 of the secondary cover segment 72 so as to help prevent water, ice and debris from entering the internal structure of the wiper blade. The edge of the second receiving wall 725 may be provided with a wall to help cover the region underneath the second covering portion 734 to add additional protection against the elements.

As can be seen in FIGS. 46 and 47, on the second connecting wall, opposite the second projections 732, reinforcing projections may be added to strengthen the integrity of the second connecting wall 731, and the connection between the secondary cover segment 72 and the tertiary cover segment 73. The second connecting wall 731 may be narrow, or may taper, so as to allow it to deflect enough to allow the second projection to enter the second seating recess 727. Again, a hole may be used in place of the second seating recess 726, and other pivoting connections known in the art, such as rivets, may also be used to establish the joint connection between the tertiary cover segments 73 and the secondary cover segments 72.

The receiving channel 712 and second receiving channel 726 may be provided with a ramp or chamfer structure to facilitate the insertion of the corresponding projection 722 and second projection 732 into same.

The tertiary cover segments 73 may be provided with internal grips to secure the segments to the corresponding portion of the cover, as described above relating to the internal grips of the center cover segment 71 and the secondary cover segments 72. The tertiary cover segment may also be provided with ribs between the side walls to give them additional structural strength and stability. Indeed, ribs may be provided to any of the cover segments 71, 72, 73, or cover sections 61, 62 described above, and the ribs may also help form the internal grips of all such structures. Persons of skill in the art will also recognize that there are numerous shapes that the internal grips can take, as described above, or as otherwise known in the art, including "L" shaped grips, "C" shaped grips, etc.

The tertiary cover segment 73 may optionally connect to additional cover segments (not shown), or may have on their outer end an end section 75. The end section 75 of the cover 70 may optionally have a securing structure, connecting the end section to the frame of the wiper blade. One such structure is depicted in FIG. 51, shows a recess 751 and a detent 752 that are shaped to engage the "T" shaped ends of the outer tertiary frames 41 of the wiper blades. As described above in connection with the "soft" cover, numerous structures are known in the art for forming that sort of connection, including without limitation the structures described in the patents and patent applications incorporated therein by reference, and all such structures and other structures known in the art may be used, and are contemplated as within the scope of the disclosed concepts.

A novel hybrid wiper blade is presented in FIG. 54. A specific embodiment of this hybrid wiper blade is set forth in concurrently filed provisional patent application entitled Hinged Wiper Blade filed concurrently herewith. The novel hybrid wiper blade generally has a primary frame, which may be as described above, and can be generally flat, curved, triangular, or have any other suitable desired shape. The primary frame 120 preferably has a connection device 110 attached to its top surface or formed integrally therewith, in any of the methods known in the art or depicted above. At either end the primary frame connects to a pair of beams 130, preferably made from spring-elastic steel, although other suitable materials may be used. As described above with respect to the connection device 1 in FIG. 1, any manner of connector, adaptor or specialized design for a particular wiper arm known in the art can be used with the connection device 110.

The connection between the beams 130 and the primary frame 120 is preferably formed by a pivot joint of some sort. This may be accomplished in any method currently known in the art. For example the beams 130 may be provided with structures (similar to a connection device 10, 110) having a two pairs of claws which are crimped, welded or form-fitted onto the beams 130, and having two parallel side walls having which may have projection, recesses or holes, rivets or other structures which can attach to recesses or holes, projections, clips and/or holes, and other complementary structures on the ends of the primary frame 120 in order to form a pivoting connection. The beams 130 may be symmetric across the pivot joint in length and/or curvature, or asymmetric (as shown in FIG. 54).

Tertiary frames 140 are secured to the beams 130, and in turn secure the wiper strip (and any vertebrae, and/or wiper strip carrier as described above. The connection between the beams 130 and the tertiary frames 140 may be made in any manner known in the art, including the use of pivoting studs 44 and other pivot joints known in the art as described above. Like the inner and outer tertiary frames 40,41 described above, the hybrid blade depicted in FIG. 54 may have symmetric or asymmetric tertiary frames 140. Additionally, any one or more of the connection device 110, primary frame 120, beams 130, and tertiary frames 140 may be provided with structure to help it connect to a cover 60, 70 described above, or any other type of cover or spoiler known in the art.

The descriptions set forth above are meant to be illustrative and not limiting, and persons of skill in the art will recognize that various common and known deviations from the above described structures are considered to be within the scope of the disclosed concepts described herein.

We claim:

1. A wiper blade comprising:
a wiper strip;
a connection device capable of connecting to a wiper arm of a vehicle as the connection device is disposed on a force distribution structure, the force distribution structure being separate from the wiper strip, having opposing ends, and comprising one or more beams and/or brackets, the force distribution structure securing the wiper strip; and
a cover separate from the wiper strip and force distribution structure, the cover secured to and covering the force distribution structure, comprising a cover center section having two end portions and two cover side sections, wherein the cover side sections cover the end portions of the cover center section and extend to and cover the opposing ends of the force distribution structure,
wherein the cover center section and cover side sections are U-shaped in cross section.

2. The wiper blade of claim 1, wherein the side sections are made from a softer, more elastic material than the center section.

3. The wiper blade of claim 2, wherein the side sections have a Shore hardness value at or between 60 and 90, and the center section has a Shore hardness value at or above 90.

4. The wiper blade of claim 3, wherein the side sections have a Shore hardness value at or between 80 and 88.

5. The wiper blade of claim 1 further comprising one or more internal grips provided on an inner surface of the center section of the cover, wherein the one or more internal grips grip the force distribution structure.

6. The wiper blade of claim 1 wherein the end portions of the cover center section comprise side connecting structures that engage corresponding side receiving structures in the cover side sections.

7. The wiper blade of claim 6 wherein the side connecting structures on the end portions of the cover center section comprise bottom projections which grip a corresponding recess or hole in the side receiving structures in the cover side sections.

8. The wiper blade of claim 1 wherein the end portions of the cover center section comprise a connecting structure having a top hole that engages a corresponding top projection in the cover side sections.

9. A wiper blade comprising:
a wiper strip;

a connection device capable of connecting to a wiper arm of a vehicle as the connection device is disposed on a force distribution structure, the force distribution structure being separate from the wiper strip, having first and second opposing ends, and comprising one or more beams, and/or brackets, the force distribution structure securing the wiper strip; and a cover separate from the wiper strip and force distribution structure, the cover secured to and covering the force distribution structure, comprising a cover center section having a first and second opposing end portions and a first cover side section, wherein the first cover side section covers the first end portion of the cover center section and extends to and covers the first end of the force distribution structure, wherein the cover center section and the first cover side section are U-shaped in cross section.

10. The wiper blade of claim 9 further comprising a second cover side section, wherein the second cover side section covers the second end portion of the cover center section and extends to and covers the second end of the wiper blade.

11. The wiper blade of claim 10 further comprising one or more internal grips provided on an inner surface of each of the side sections, wherein each of the one or more internal grips grip the force distribution structure.

12. The wiper blade of claim 11, wherein each end of the force distribution structure is a chamfered "T" structure, and each of the internal grips is an end grip with a slotted pocket; wherein the chamfered "T" structures of the ends of the force distribution structure are disposed within the slotted pockets of the cover side sections.

13. The wiper blade of claim 9, wherein the first side section is made from a softer, more elastic material than the center section.

14. The wiper blade of claim 9, wherein the first side section has a Shore hardness value at or between 60 and 90, and the center section has a Shore hardness value at or above 90.

15. The wiper blade of claim 14, wherein the first side section has a Shore hardness value at or between 80 and 88.

16. The wiper blade of claim 9 further comprising one or more internal grips provided on an inner surface of the center section of the cover for gripping the force distribution structure.

17. The wiper blade of claim 9 further comprising one or more internal grips provided on an inner surface of the first side section for gripping the force distribution structure.

18. The wiper blade of claim 17, wherein the first end of the force distribution structure is a chamfered "T" structure, and the internal grip of the first side section is an end grip with a slotted pocket for receiving the first end of the force distribution structure.

19. A wiper blade comprising:

a wiper strip;

a connection device capable of connecting to a wiper arm of a vehicle as the connection device is disposed on a force distribution structure, the force distribution structure being separate from the wiper strip, having opposite ends, and comprising one or more beams, and/or brackets, the force distribution structure securing the wiper strip; and a cover separate from the wiper strip and force distribution structure, the cover secured to and covering the force distribution structure, comprising a cover center section having two end portions and two cover side sections, wherein the cover side sections cover the end portions of the cover center section and extend to and cover the opposing ends of the wiper blade, wherein the cover center section further comprises one or more internal grips provided on an inner surface of the center section of the cover that grip the force distribution structure, wherein each cover side section further comprises one or more internal grips provided on an inner surface of each of the side sections that grip the force distribution structure, and wherein the cover center section and the cover side sections are U-shaped in cross section.

20. The wiper blade of claim 19, wherein each end of the force distribution structure is a chamfered "T" structure, and each of the internal grips is an end grip with a slotted pocket for receiving one of the ends of the force distribution structure.

* * * * *